(12) United States Patent
Prater et al.

(10) Patent No.: US 12,405,215 B2
(45) Date of Patent: Sep. 2, 2025

(54) ASYMMETRIC QUADRATURE INTERFEROMETRY FOR THIN FILM INTERFERENCE SUPPRESSION IN OPTICAL PHOTOTHERMAL INFRARED SPECTROSCOPY

(71) Applicant: Photothermal Spectroscopy Corp., Santa Barbara, CA (US)

(72) Inventors: Craig Prater, Santa Barbara, CA (US); Derek Decker, Carmel, CA (US); David Grigg, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 215 days.

(21) Appl. No.: 18/300,858

(22) Filed: Apr. 14, 2023

(65) Prior Publication Data
US 2024/0353324 A1 Oct. 24, 2024

(51) Int. Cl.
*G01N 21/35* (2014.01)
*G01N 21/3563* (2014.01)

(52) U.S. Cl.
CPC ................. *G01N 21/3563* (2013.01)

(58) Field of Classification Search
CPC .................................. G01N 21/3563
See application file for complete search history.

(56) References Cited

U.S. PATENT DOCUMENTS

| | | | | |
|---|---|---|---|---|
| 5,268,746 A | * | 12/1993 | Masetti | G01N 21/171 356/128 |
| 5,408,327 A | * | 4/1995 | Geiler | G01N 21/17 356/432 |
| 5,781,294 A | * | 7/1998 | Nakata | G01N 21/1702 356/502 |
| 6,812,047 B1 | * | 11/2004 | Borden | G01N 21/95684 356/369 |
| 6,882,424 B2 | * | 4/2005 | Opsal | G01N 21/211 356/369 |
| 9,091,594 B2 | | 7/2015 | Furstenberg | |
| 11,002,665 B2 | | 5/2021 | Prater | |
| 11,480,518 B2 | | 10/2022 | Prater | |
| 11,592,391 B2 | * | 2/2023 | Li | G01Q 30/02 |
| 2008/0151247 A1 | * | 6/2008 | Salnik | G01N 21/1717 356/432 |
| 2015/0226676 A1 | * | 8/2015 | Nicolaides | G01N 21/9505 356/237.5 |
| 2017/0211977 A1 | * | 7/2017 | Jeys | G01J 3/433 |
| 2020/0340953 A1 | * | 10/2020 | Koek | G01N 29/06 |
| 2021/0164894 A1 | | 6/2021 | Prater | |
| 2021/0215601 A1 | | 7/2021 | Prater | |
| 2022/0074861 A1 | | 3/2022 | Cheng | |

(Continued)

OTHER PUBLICATIONS

Hwang, Jeong-hwan, Quadrature-detection-error Compensation in a Sinusoidally Modulated Optical Interferometer Using Digital Signal Processing, Jun. 25, 2019, vol. 3, No. 3, p. 204-209, as available at https://doi.org/10.3807/COPP.2019.3.3.204.

(Continued)

*Primary Examiner* — Hugh Maupin
(74) *Attorney, Agent, or Firm* — MERCHANT & GOULD P.C.

(57) ABSTRACT

Asymmetric interferometry is used with various embodiments of Optical Photothermal Infrared (OPTIR) systems to suppress thin film interference effects.

22 Claims, 7 Drawing Sheets

(56) References Cited

U.S. PATENT DOCUMENTS

2022/0381684 A1 12/2022 Cheng
2023/0045375 A1* 2/2023 Cheng .................... G01N 21/35

OTHER PUBLICATIONS

Selvam K.C.. et al., A Simple Square Rooting Circuit Based on Operational Amplifiers (OPAMPs), vol. 3, Issue 1, pp. 349-351, Feb. 2013, as available at https://etasr.com/index.php/ETASR/article/view/234.

Quadrature Michelson Interferometer, as available at https://sites.google.com/a/umn.edu/mxp/advanced-labs/quadrature-michelson-interferometer, as retrieved on Apr. 13, 2023.

R. Furstenberg, C. A. Kendziora, M. R. Papantonakis, V. Nguyen and R. A. McGill, "Chemical Imaging using Infrared Photo-thermal Microspectroscopy" Proc. of SPIE vol. 8374, 837411 (2012).

C. Li, D. Zhang, M. N. Slipchenko, and J.-X. Cheng, Anal. Chem., 89, 9, 4863-4867 (2017).

D. Zhang, C. Li, C. Zhang, M. N. Slipchenko, G. Eakins, and J.-X. Cheng, Science Advances, Depth-resolved mid-infrared photothermal imaging of living cells and organisms with submicrometer spatial resolution, 2, 9, e1600521 (2016).

Z. Li, K. Aleshire, M. Kuno, and G. V. Hartland, The Journal of Physical Chemistry B, "Super-Resolution Far-Field Infrared Imaging by Photothermal Heterodyne Imaging", 121, 37, 8838-8846 (2017).

Z. Li, M. Kuno, and G. Hartland, "Super-resolution imaging with mid-IR photothermal microscopy on the single particle level", in SPIE Nanoscience + Engineering (International Society for Optics and Photonics, 2015), p. 954912-954912-954918.

Z. Li, M. Kuno, and G. Hartland, "Super-resolution Mid-infrared Imaging using Photothermal Microscopy", in Conference on Lasers and Electro-Optics (Optical Society of America, San Jose, California, 2016), p. ATu3J.7.

A. Mërtiri, A. Totachawattana, H. Liu, M. K. Hong, T. Gardner, M. Y. Sander, and S. Erramilli, "Label free mid-IR photothermal imaging of bird brain with quantum cascade laser", in CLEO: Applications and Technology (Optical Society of America, 2014), p. AF1B. 4.

M. Y. Sander, "Mid-infrared photothermal imaging", in Laser Science (Optical Society of America, 2015 ), p. LM11. 2.

Y. Elsworth and J. James, "An optical screw with a pitch of one wavelength," Journal of Physics E: Scientific Instruments 1973 vol. 6.

M. Doboszy, T. Usuda and T. Kurosawa, in "Methods for the calibration of vibration pick-ups by laser interferometry: I. Theoretical analysis," Meas. Sci. Technol. 9 (1998) 232-239.

P. Gregorčič et al Quadrature phase-shift error analysis using a homodyne laser interferometer (Optics Express vol. 17, Issue 18, pp. 16322-16331 (2009).

Zong, Haonan et al., "Bond-Selective Full-Field Optical Coherence Tomography", Department of Electrical and Computer Engineering, Boston University, Boston, MA, Jan. 31, 2023,.

PCT Application No. PCT/US2024/024138, International Search Report and Written Opinion, mailed Aug. 5, 2024, 9 pages.

* cited by examiner

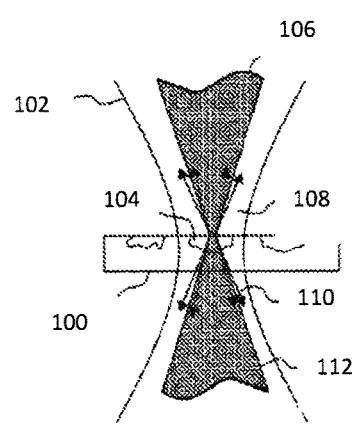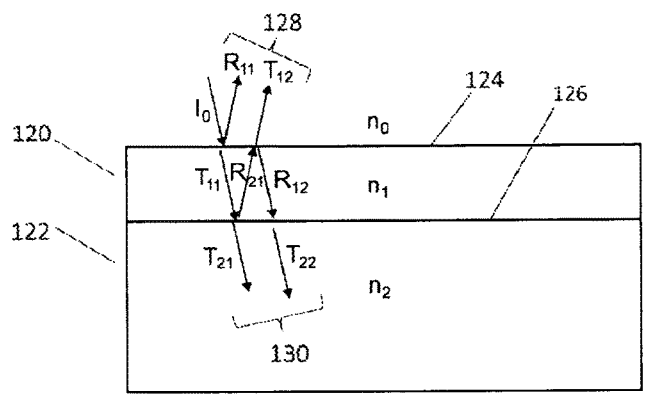
FIG. 1A
FIG. 1B
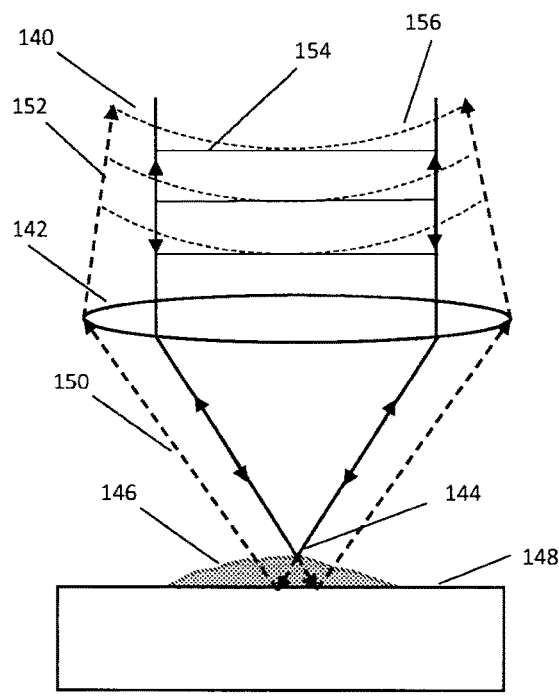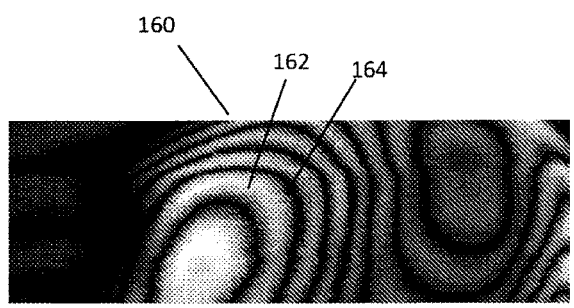
FIG. 1C
FIG. 1D

ASYMMETRIC QUADRATURE INTERFEROMETRY FOR THIN FILM INTERFERENCE SUPPRESSION IN OPTICAL PHOTOTHERMAL INFRARED SPECTROSCOPY

This invention was made with government support under DE-SC0018519 awarded by the U.S. Department of Energy. The government has certain rights in the invention.

TECHNICAL FIELD

This disclosure relates to investigating or analyzing materials by the use of optical means, i.e. using infra-red, visible or ultra-violet light. In particular, this disclosure is related to infrared spectroscopy and imaging with spatial resolution down to the sub-micron scale using an optical photothermal detection technique.

BACKGROUND

Optical photothermal techniques have been described in U.S. Pat. Nos. 9,091,594 and 9,841,324, for example. These references often refer to the technique by different names and acronyms. For the purposes of this application, these techniques collectively will be referred to as Optical Photothermal Infrared (OPTIR).

Several research groups have worked in this general field of OPTIR, including researchers at Naval Research Laboratory, Purdue University, Notre Dame University, Boston University, and the Massachusetts Institute of Technology. Instruments developed in these labs use visible light beams to probe the photothermal response of samples in response to absorption of infrared radiation. Potentially relevant background publications and patents include: (1) R. Furstenberg, C. A. Kendziora, M. R. Papantonakis, V. Nguyen and R. A. McGill, "Chemical Imaging using Infrared Photo-thermal Microspectroscopy" Proc. of SPIE Vol. 8374, 837411 (2012); (2) R. Furstenberg, C. Kendziora, N. D. Bassim, R. A. McGill, and V. K. Nguyen, U.S. Pat. No. 9,091,594 B2 (2015); (3) C. Li, D. Zhang, M. N. Slipchenko, and J.-X. Cheng, Anal. Chem., 89, 9, 4863-4867 (2017); (4) D. Zhang, C. Li, C. Zhang, M. N. Slipchenko, G. Eakins, and J.-X. Cheng, Science Advances, 2, 9, e1600521 (2016). (5) Z. Li, K. Aleshire, M. Kuno, and G. V. Hartland, The Journal of Physical Chemistry B, 121, 37, 8838-8846 (2017); (6) Z. Li, M. Kuno, and G. Hartland, "Super-resolution imaging with mid-IR photothermal microscopy on the single particle level", in SPIE Nanoscience+ Engineering (International Society for Optics and Photonics, 2015), p. 954912-954912-954918; (7) Z. Li, M. Kuno, and G. Hartland, "Super-resolution Mid-infrared Imaging using Photothermal Microscopy", in Conference on Lasers and Electro-Optics (Optical Society of America, San Jose, California, 2016), p. ATu3J.7.; (8) A. Mërtiri, A. Totachawattana, H. Liu, M. K. Hong, T. Gardner, M. Y. Sander, and S. Erramilli, "Label free mid-IR photothermal imaging of bird brain with quantum cascade laser", in CLEO: Applications and Technology (Optical Society of America, 2014), p. AF1B. 4; (9) M. Y. Sander, "Mid-infrared photothermal imaging", in Laser Science (Optical Society of America, 2015), p. LM1I. 2.

SUMMARY

According to embodiments described herein, microscopic analysis of a sample uses asymmetric interferometry techniques to improve characterization of infrared absorption of the sample and in particular provide a detection mechanism that can suppress effects of thin film interference and provide a measurement that is insensitive to vibration and thermal drift.

According to one embodiment, an apparatus for microscopic analysis of a sample improves characterization of infrared absorption of the sample. The apparatus includes a source of infrared radiation configured to illuminate the sample with a beam of infrared radiation and a source of probe radiation configured to emit a beam of probe radiation. The apparatus further includes an asymmetric interferometer including a beam splitter configured to divide the beam of probe radiation onto at least two paths. A first path is directed towards the sample such that the beam of probe radiation on the first path at least partially overlaps the beam of infrared radiation, and a second path is directed towards a reference reflector. A beam combiner is configured to create an interference of probe radiation reflected from the sample along the first path with probe radiation reflected from the reference reflector along the second path, wherein a power of the probe radiation reflected along the second path is greater than a power of the probe radiation reflected along the first path. A detector is configured to detect the interference of probe radiation for use in producing a signal indicative of infrared absorption of the sample.

The apparatus further includes a quadrature interferometer configured to measure and adjust a relative phase of the probe radiation along the first path versus the second path. In embodiments, the beam splitter and the beam combiner can both comprise a common beam splitting optical component. The beam splitting optical component reflects about 50% of incident light and transmits about 50% of incident light. The detector can include a plurality of detectors with a difference in optical phase between at least two of the detectors for use in reconstructing the signal at any phase.

According to another embodiment, a method for microscopic analysis of a sample to provide improved characterization of infrared absorption of the sample includes illuminating the sample with a beam of infrared radiation to create an infrared illuminated spot on the sample, producing a beam of probe radiation, and dividing the beam of probe radiation at a beam splitter onto at least two paths. The two paths include a first path that is directed towards the sample such that the beam of probe radiation on the first path at least partially overlaps the beam of infrared radiation, and a second path that is directed towards a reference reflector. The method further includes recombining the probe radiation reflected from the sample along the first path and the probe radiation reflected off the reference reflector along the second path to create an interference of probe radiation, wherein a power of the probe radiation reflected along the second path is greater than a power of the probe radiation reflected along the first path, and detecting the interference of probe radiation for use in producing a signal indicative of infrared absorption of the sample.

In embodiments, the method further includes measuring and adjusting a relative phase of the probe radiation along the first path versus the second path. In embodiments, the phase feedback loop comprises an amplifier, a demodulator, and a processor, and wherein the method further comprises actively adjusting a length of the second path to maintain constructive interference between the probe radiation reflected from the sample along the first path and the probe radiation reflected from the reference reflector along the second path. The method can include measuring and adjusting a relative phase of the probe radiation along the first path versus the second path with a quadrature interferometer.

Dividing and recombining may both be accomplished with a common beam splitting optical component. The beam splitting optical component reflects about 50% of incident light and transmits about 50% of incident light, in embodiments. Recombining may include using a plurality of detectors with a difference in optical phase between at least two of the plurality of detectors for use in reconstructing the signal at any phase.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1A shows a simplified schematic diagram of the photothermal principle employed by optical photothermal infrared (OPTIR) spectroscopy and imaging.

FIG. 1B shows a simplified illustration of the origin of thin film interference.

FIG. 1C shows a simplified illustration regarding the origin of thin film interference in microscopy.

FIG. 1D shows an example of thin film interference in an OPTIR measurement of a polymer film of variable thickness.

Figure 2:
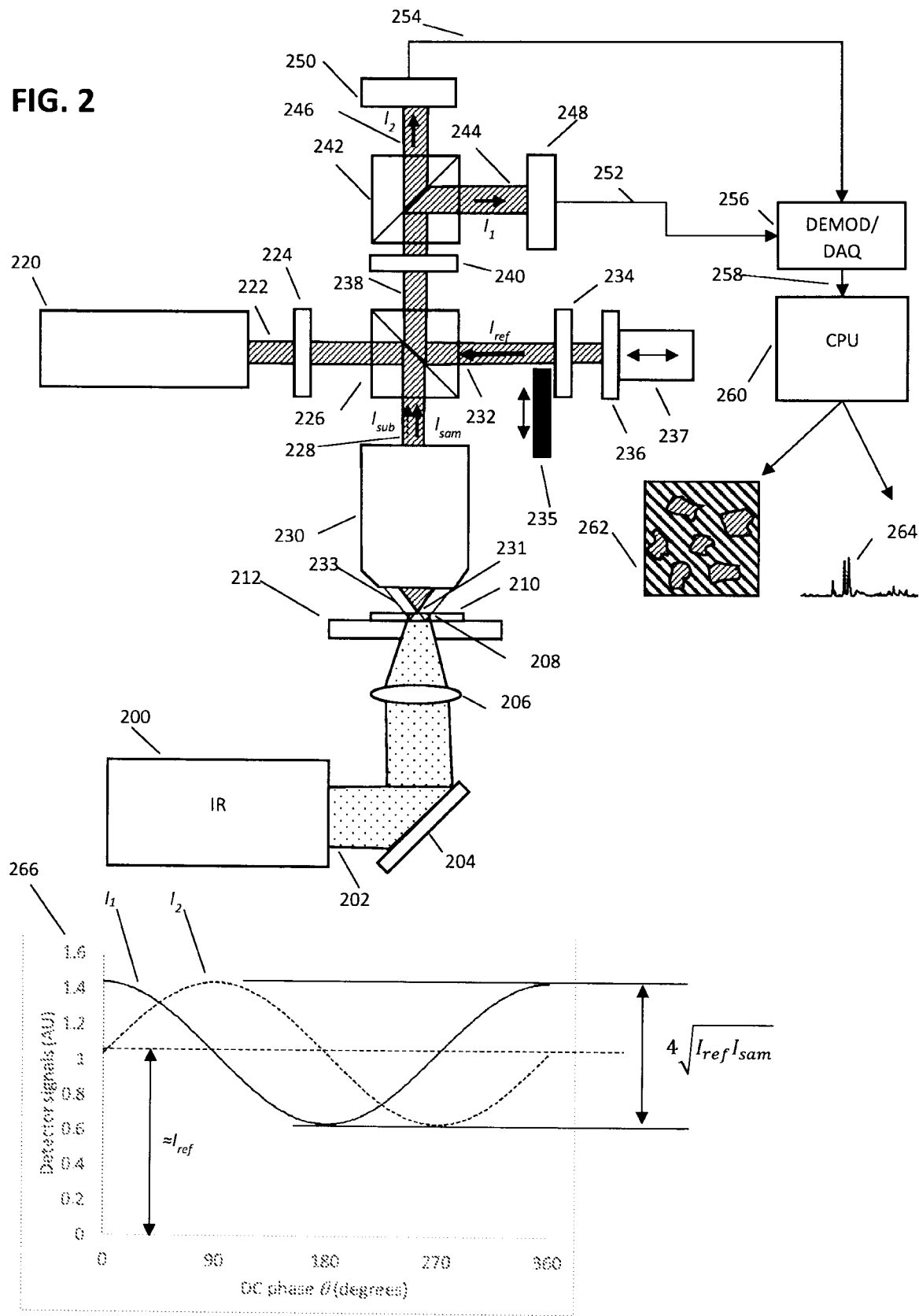
FIG. 2 is a simplified schematic diagram of an embodiment of a quadrature asymmetric interferometric OPTIR system with thin film interference suppression.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

This specification described methods and apparatuses for performing optical photothermal infrared (OPTIR) imaging and spectroscopy with improved sensitivity, improved signal-to-noise ratio, and decreased background signal.

For purposes of this specification, the following terms are specifically defined as follows:

An "analyzer/controller" refers to a system to facilitate data acquisition and control of the OPTIR system. The controller may be a single integrated electronic enclosure or may comprise multiple distributed elements. The control elements may provide control for positioning and/or scanning of the probe tip and/or sample. They may also collect data about the probe deflection, motion or other response, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs may be implemented along with discrete circuit components to carry out one or more of the processes described herein.

"Beam combiner" means an optical element that can combine two beams onto the same optical path. In one configuration, a beam combiner may be a beam splitter used in a reverse direction, i.e. combining one beam that reflects off of the beam splitter interface with another beam that is transmitted through the beam splitter interface. A beam splitter cube, for example, can be used as both a beam splitter and a beam combiner. Optical elements that are marketed as beam splitters can be used as a beam combiner, even if they are not used to split light onto two paths. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam combiner can also be an optical fiber based device, for example combining the light from two input fibers into one output fiber, for example a 1×2 fiber coupler. A single 1×2 fiber coupler can be used as both a beam splitter and a beam combiner.

"Beam splitter" refers to an optical element that can divide light onto at least two paths. A beam splitter can comprise a plate, a cube and/or a prism or other shapes/configurations that can divide a beam of light. The beam splitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Nomarski or Wollaston prism. A beam splitter may also be non-polarizing, where light is divided between two paths without substantial dependence on the polarization of the incident light. A beam splitter can also be an optical fiber based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another.

A "camera" refers to an array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher.

The phrases "collecting probe light" and "collecting probe radiation" refer to collecting radiation of a probe light beam that has interacted with a sample. The probe light can be collected after reflection, scattering, transmission, evanescent wave coupling, and/or transmission through an aperture probe.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/radiation incident on the detector surface. The signal will generally be an electrical signal, for example a voltage, current and/or an electrical charge. The detector may be a photodiode, a photo-transistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two dimensional array of detector elements, including camera based detectors.

"Diffraction limit" of a light beam means the minimum separation of two optical sources that can be distinguished by a detector. The Abbe diffraction limit d for a microscope having a numerical aperture (NA) and operating at a wavelength $\lambda$ is defined as $d=\lambda/(2 \cdot NA)$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation.

A "demodulator" refers to a device or system that performs demodulation.

A "feedback loop" is a control loop that is intended to maintain a parameter substantially near a target value ("setpoint") through the adjustment of a control element. A "phase feedback loop" is a feedback loop intended to attempt to maintain the optical phase difference of an interferometer at a target phase value. Note that despite the feedback loop, the optical phase difference will generally not remain truly constant or fixed as disturbances in the optical phase difference can occur at speeds that are too fast for the phase feedback loop to compensate. As such there is often an error, especially a transient error between the target phase value and the actual phase.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Fluorescence" refers to the emission of light from a sample at one wavelength due to excitation at another wavelength due to fluorescent excitation and emission processes.

"Illuminate," "Illuminating," and "Illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting elements, focusing elements and any other beam steering or conditioning elements.

"Infrared absorption spectrum" refers to a spectrum that is proportional to the wavelength dependence of the infrared absorption coefficient, absorbance, or similar indication of IR absorption properties of a sample. An example of an infrared absorption spectrum is the absorption measurement produced by a Fourier Transform Infrared (FTIR) spectrometer, i.e. an FTIR absorption spectrum. In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. It is noted that IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, CO2 lasers, microscopic heaters, electrically or chemically generated sparks, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 $cm^{-1}$ or <1 $cm^{-1}$ less, or may be broadband, for example with a spectral width of >10 $cm^{-1}$, >100 $cm^{-1}$ or greater than 500 $cm^{-1}$. Broadband sources can be made narrow band with filters, monochromators and other devices. The infrared source can also be made up of one of discrete emission lines, e.g. tuned to specific absorption bands of target species.

"Interacting" in the context of interacting with a sample means that light illuminating a sample is at least one of scattered, refracted, absorbed, aberrated, diverted, diffracted, transmitted, and reflected by, through and/or from the sample.

"Interference" reference to the interaction of at least two beams of light including the coherent combination of those light beams.

An "interferometer" refers to an optical apparatus that combines light on at least two paths to create interference between at least two beams. In the context of this application, the two paths are sometimes referred to as a "sample arm" where the light interacts with a sample, and a "reference arm" where the light interacts with a reference reflector.

"Asymmetric interferometer" refers to a configuration of an interferometer comprising interference between light on a sample arm and light on a reference arm in which the amount of light on the reference arm is larger than the amount of light on the sample arm. Note that this is different from other uses of this term that may imply a difference in the length of the arms of the interferometer. The asymmetric interferometer described herein may have equal or unequal interferometer arms, but the asymmetric term refers in this case to the difference in optical power between the reference and sample arms.

A "common path interferometer" is an interferometer in which at least the majority of the sample arm and reference arm share a common optical path and only a minority of the optical path is different.

A "quadrature interferometer" refers to an interferometer with at least two optical paths on which interference occurs and at least two detectors to detect interfering radiation on the two optical paths. A quadrature interferometer can be configured to have an optical phase delay of around 90° between the two interfering paths and hence the two detectors. Quadrature interferometers may also have more detectors, for example four detectors.

A "heterodyne interferometer" refers to an optical interferometer in which the optical frequency and/or optical phase is modulated in at least one arm of the interferometer as compared to the other arm. A heterodyne interferometer can include a "phase modulator," an optical element that can modulate the phase and/or frequency of the light passing through it or reflecting off of it. Phase modulators can include acousto-optic modulators, electro-optic modulators, liquid crystal modulators, or other devices that alter the phase/frequency of light in response to an input signal or stimulus.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

A "mass spectrometer" refers to an apparatus for analyzing the molecular mass distribution of an analyte.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high-speed rotating mirror devices. Modulation can also be accomplished with devices that provide time varying transmission like acousto-optic modulators, electro-optic modulators, photo-elastic modulators, pockel cells, and the like. Modulation can also be accomplished with diffraction effects, for example by diffractive MEMS-based modulators, or by high-speed shutters, attenuators, or other mechanisms that change the intensity, angle, and/or phase of the laser intensity incident on the sample.

"Near infrared light" generally refers to a wavelength range of infrared (IR) light corresponding to 0.75-2 µm.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with illuminating radiation.

A "narrowband light source" a light source with a narrow bandwidth or linewidth, for example a light of linewidth smaller than 8 cm$^{-1}$, but in general it can be a light source with a linewidth narrow enough that the linewidth does not cover a spectral range of interest of the sample.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

A "probe source," "probe light source," or "probe radiation source" refer to a radiation source that can be used for sensing of an optical property of a sample. A probe light source can be used to sense the response of the sample to the incidence of light from the infrared light source. The radiation source may comprise a gas laser, a laser diode, a superluminescent diode (SLD), a near infrared laser, a UV and/or visible laser beam generated via sum frequency or difference frequency generation, for example. It may also comprise any or other sources of near-infrared, UV, and/or visible light that can be focused to a spot on the scale smaller than 2.5 micrometer, and or even smaller than 1 micrometer, and possibly smaller than 0.5 micrometer. In some embodiments, the probe light source may operate at a wavelength that is outside the tuning or emission range of the infrared light source, but the probe light source can also be a fixed wavelength source at a select wavelength that does in fact overlap with the tuning range of the infrared light source. A "probe light beam" or "sensing light beam" is a beam originally emitted from a probe light source.

"Probe beam" is a beam of light or radiation that is directed onto a sample to detect a photothermal distortion or other optical change resulting from the interaction of IR radiation with the sample, for example to detect the absorption of IR radiation by the sample.

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

A "signal processor" is an analog and/or digital device that is used to process one or more signal, for example performing filtering, level shifting, squaring, summing, root-mean-square summing and/or any other computation or transformation of an analog and/or digital signal. A signal processor may be an analog circuit where all filtering/shifting/computations are performed with discrete analog components, or one of more digital processors, for example a CPU, computer, field programmable gate array, digital signal processor, or any other suitable digital computation means. The signal processor may be a hybrid of both analog and digital components.

A "retarder" refers to an optical element that induces a relative optical phase delay in an optical path. Examples of retarders are wave plates, for example half wave plates, quarter wave plates and eight wave plates. One or more retarders/wave plates can be used to introduce an optical phase difference between two polarizations of light, for example to introduce a phase difference between two paths of a quadrature interferometer.

"Spectrum" refers to a measurement of one or more properties of a sample as a function of wavelength or equivalently (and more commonly) as a function of wavenumber.

The terms "about" or "approximate" and the like are synonymous and are used to indicate that the value modified by the term has an understood range associated with it, where the range can be ±20%, ±15%, ±10%, ±5%, or ±1%.

The term "substantially" is used to indicate that a result (e.g., measurement value) is close to a targeted value, where close can mean, for example, the result is within 80% of the value, within 90% of the value, within 95% of the value, or within 99% of the value.

Optical Photothermal Infrared (OPTIR) Imaging and Spectroscopy

FIG. 1 illustrates the basic operational concept of an OPTIR imaging system. Some systems that are usable in an OPTIR system are described in commonly-owned U.S. Pat. No. 11,002,665 and US Patent Application Pub. No. 2021/0215601, for example, the disclosures of which are incorporated by reference in their entirety. One type of OPTIR imaging architecture, as referred to in the Definitions section above, is a system that uses asymmetric interferometry. That is, systems in which interference is detected between light on a sample arm and light on a reference arm in which the amount of light on the reference arm is larger than the amount of light on the sample arm. Asymmetric interferometry in OPTIR systems is described in commonly-owned U.S. Pat. No. 11,480,518, the contents of which are incorporated herein by reference in their entirety.

Referring to FIG. 1, a sample 100 is illuminated by an infrared beam 102. The infrared beam is tuned to an IR wavelengths where a region 104 of the sample 100 absorbs IR light, e.g. when the IR wavelength corresponds to an absorption band of chemical bonds in region 104. Absorbed IR light will cause a local temperature rise within region 104 and a resulting photothermal distortion in region 104, resulting from thermal expansion and/or index of refraction changes in the absorbing region. A probe beam 106 is used to illuminate at least a portion of the IR illuminated area of the sample and is used to probe the photothermal distortions in the sample. The photothermal distortions can involve changes in surface position, surface curvature, sample size, reflectivity, and/or transmissivity. Any/all of these effects can result in a change in the intensity and distribution of probe light reflected, transmitted and/or scattered from the IR absorbing region of the sample, as indicated schematically by arrows 108 (reflected/backscattered direction) and 110 (transmitted/forward scattered direction). The change in temperature of the IR absorbing region 104 of sample 100 and/or surroundings (such as the air or fluid above or surrounding the sample) can cause a change in the phase, polarization, intensity and/or angles of light reflected, transmitted, and/or scattered from the probe beam illuminated region of the sample. By measuring fluctuations in collected probe light it is possible to create a signal indicative of the absorption of IR light by the absorbing regions 104 of the sample. After interaction with IR absorbing regions of the sample, probe light can be collected in reflecting/back scattered direction (e.g. back along incident beam path 106) and/or in the transmission/forward scattered direction (112).

In some systems, the probe beam 106 can comprise a beam of visible and/or ultraviolet light, i.e. a wavelength that is significantly shorter than that of the IR light 102. The reason for the use of UV or visible light is that the shorter wavelengths of UV/visible light allows it to be focused to a much smaller spot than the IR radiation. As such it can be used to measured IR absorption with spatial resolution a factor>10× better than with conventional IR microscopy. In far-field microscopy, optical diffraction limits the spatial resolution achievable to a length scale on the order of the wavelength of light used. Specifically, the minimum detectable separation $\delta$ between two objects using the Rayleigh criterion is given by $\delta=0.61\lambda/(n\ NA)$, where $\lambda$ is the wavelength of infrared light used, n is the index of refraction of the surrounding media, and NA is the effective numerical aperture of the microscope objective used. High power IR objectives usually have a maximum NA in the range from 0.7 to 0.81, setting the best achievable spatial resolution in air under the Rayleigh criterion to around 75% to 87% of the wavelength used. For example, at $\lambda=10$ μm, the spatial resolution $\delta$ is around 8 μm.

The spatial resolution achievable by the OPTIR technique is set by the wavelength of the visible probe beam, not the wavelength of the IR beam. The improvement in spatial resolution achievable with the OPTIR technique is determined by the ratio of the IR wavelength to the probe wavelength. For example, with $\lambda_{IR}=10$ μm and $\lambda_{probe}=0.532$ μm, the spatial resolution improvement for the OPTIR technique can be (10/0.532)~19× better conventional IR microscopy with the same objective. Using $\lambda_{probe}=0.532$ μm and the same NA as above, the OPTIR technique produce spatial resolution of around 0.4 μm. Even higher spatial resolution can be achieved with higher NA objectives, for example an objective optimized for visible light microscopy and/or using shorter wavelength probe beams, for example in the blue/UV range.

In some embodiments, brief periodic pulses of IR illumination (on the order of hundreds of nanoseconds) are used. The use of brief IR pulses in combination with synchronous detection techniques can provide high sensitivity and spatial resolution. The signal indicative of IR absorption can be measured as a function of the wavelength of IR radiation to generate IR absorption spectra and the IR absorption signal can be measured as a function of relative sample position to generate spatially resolved maps of chemical composition of the sample. Spatially resolved maps can be created by measuring IR absorption at select wavelengths (or equivalently wavenumbers) as a function of sample position, and/or entire IR absorption spectra can be measured at multiple locations on a sample. In this case of so-called hyperspectral imaging, the data cube has transverse dimensions x and y along the sample surface while the third dimension comprises IR absorption spectra which is used to identify molecules by their excitation modes (stretching, bending, twisting, etc.).

Optical Photothermal Infrared (OPTIR) microscopy is a relatively new technique that uses an optical microscope to provide measurements of infrared absorption with spatial resolution roughly 10× better than conventional IR microscopes. This is achieved by using a shorter wavelength "probe beam" to measure IR absorption on a much smaller length scale than the IR microscope. The reason for the resolution improvement is that the shorter wavelength light results in a smaller diffraction limit. For example using a probe beam with a wavelength of 532 nm, the equation above gives a diffraction limit of d=0.34 µm, more than 10× better than the IR example above.

The OPTIR technique works by measuring small changes in the probe beam after interacting with IR absorbing regions of the sample. IR absorbing regions of the sample convert absorbed IR radiation into heat, causing a local temperature rise in the sample. This temperature rise can change the shape, size, surface position, and/or index of refraction of the IR absorbing regions of the sample. One or more of these changes can change the intensity, angle, and or optical phase of probe light after interacting with the sample. Light that is reflected from, scattered from and/or transmitted through the sample can be collected and analyzed. Unfortunately, the degree of photothermal modulation of the probe beam is quite small. For example, this temperature change in the IR absorbing regions of the sample typically causes a small fractional change $\gamma$ in the amount of probe light reflected and/or scattered from and/or transmitted through the sample. This fractional photothermal change $\gamma$ is typically of order $10^{-4}$/° C., i.e. the IR absorption of the sample induces only a one part in 10,000 per degree Celsius change in the amount of light returning from the sample. This can make accurate and sensitive detection of IR absorption quite difficult, especially for weakly absorbing samples and/or weak absorption bands.

Another issue that can complicate some OPTIR measurements is thin film interference, as illustrated schematically in FIGS. 1B-1D. Thin film interference originates from constructive/destructive interference that occurs when light is reflected from multiple surfaces. FIG. 1B illustrates multiple reflections that can cause interference from a thin film 120 on a substrate 122. If the sample is illuminated by an incoming beam $I_0$, there will be a primary reflection $R_{11}$ from top surface 124, while the remaining portion of the incident beam $T_{11}$ will transmit through the thin film 120 until it reaches the surface 126 of substrate 122. A portion of the $T_{11}$ beam will reflect at this sample/substrate interface as $R_{22}$ and a portion of that beam will emerge from the sample as beam $T_{12}$. Beams $R_{11}$ and $T_{12}$ form an interfering pair 128. If this interfering beam pair 128 is collected by a detector (not shown), the intensity of the collected beam will be modulated by the relative optical phase difference $\phi$ between beams $R_{11}$ and $T_{12}$. Assuming normal incidence, the intensity of light from reflecting interfering light pair 128 is given by:

$$I_r = R_{11} + T_{12} + 2\sqrt{R_{11}T_{12}} \cos \phi \qquad \text{Eq. 1}$$

The phase difference $\phi$ depends on the thickness h of sample film 120, as well as the wavelength $\lambda$ of the incident light beam $I_0$.

$$\phi = \frac{4\pi h}{\lambda} \qquad \text{Eq. 2}$$

Thus the intensity of the interfering beams 128 has an oscillatory dependence on the sample thickness h as shown in Eq. 3.

$$I_r = R_{11} + T_{12} + 2\alpha\sqrt{R_{11}T_{12}} \cos \frac{4\pi h}{\lambda} \qquad \text{Eq. 3}$$

Where $\alpha$ is the interferometric coupling efficiency. A similar interference occurs in the transmission direction between interfering beam pair 130 resulting from interference of beams $T_{21}$ and $T_{22}$.

The oscillatory dependence on sample thickness of the intensity of the collected probe light can create variations in photothermal thermal sensitivity in OPTIR measurements as well. The OPTIR signal generally is constructed from a differential measurement between the conditions of IR light on and off, for example demodulating an amplitude of collected probe intensity variation at a pulse frequency of the IR light beam. The OPTIR sensitivity S can be approximated by the derivative of Eq. 3 with respect to temperature T, as shown in Eq. 4.

$$S = \frac{dI_r}{dT} = \frac{dR_{11}}{dT} + \frac{dT_{12}}{dT} + \qquad \text{Eq. 4}$$
$$\frac{8\pi\alpha}{\lambda}\frac{dh}{dT}\sqrt{R_{11}T_{12}} \sin \frac{4\pi h}{\lambda} + 2\alpha\frac{d\sqrt{R_{11}T_{12}}}{dT} \cos \frac{4\pi h}{\lambda}$$

Eq. 4 shows an oscillatory dependence of the photothermal sensitivity S via the sine and cosine terms that depend on the sample thickness h.

Note that the interference described associated with FIG. 1B can result from other surfaces besides. The top surface of a sample and the underlying substrate. This interference can also result from any other secondary reflection from a second surface within a sample, for example a second surface in a laminated polymer sample, or a secondary scattering surface in a cell, for example at the nucleus.

FIG. 1C illustrates how thin film interference manifests in a microscopy application. Collimated incoming probe beam 140 is focused by a focusing optic 142 (e.g. a microscope objective) to form a focused probe beam spot 144 on sample 146. If the focusing optic is at best focus, the return light will follow substantially the same path as the incoming light and be recollimated on the way out.

A fraction of the incident probe light will transmit through the sample surface and will reflect off top surface of the underlaying substrate 148, returning as beam 150. Since beam 150 is not at the focal point of focusing optic 142, the substrate reflected beam 152 will be converging. While the wavefronts 154 of the sample reflected beam will be substantially planar, the substrate reflected beam will have curved wavefronts 152. The overlap of planar and curved wavefronts creates a ripple pattern across diameter of the interfering sample/substrate reflected beam. This ripple pattern depends on the sample thickness h which in turn can impact the photothermal sensitivity of an OPTIR measurement.

FIG. 1D shows an example of an OPTIR measurement on a thin film of polystyrene constructed to illustrate the interference phenomena. The polystyrene droplet has a variable thickness contour, similar to the profile of sample 146 in FIG. 1C. FIG. 1D shows the intensity of an OPTIR signal across a plurality of XY locations on the polystyrene sample, revealing a so-called fringe pattern (alternating dark and light areas). This contrast is not due to actual variations in IR absorption in the sample, but rather due to the oscillatory dependence of the OPTIR signal on sample thickness. When such fringes present in an OPTIR image, it can complicate the interpretation of the OPTIR image. Applicant's copending patent application Ser. No. 18/171,161 filed on 17 Feb. 2023 and entitled "Method and Apparatus for Improved Composite Multi-Wavelength Photothermal Infrared Imaging" discusses methods for normalizing for these OPTIR sensitivity variations using ratios of images collected at different infrared wavelengths. The contents of U.S. Ser. No. 18/171,161 are incorporated herein by reference in their entirety. The instant application describes an alternate approach to provide OPTIR measurements where the effects of thin film interference are substantially suppressed.

FIG. 2 is a simplified schematic diagram of an asymmetric quadrature interferometer configured to suppress effects of thin film interference in OPTIR measurements. The apparatus of FIG. 2 accomplishes this suppression employing two main approaches: (1) Interfering the collected probe beam with a reference beam of sufficient intensity that it swamps parasitic reflections from the sample substrate; and (2) creating a composite photothermal signal that is insensitive to the relative optical phase between the sample surface and the reference mirror.

Referring to FIG. 2, an infrared source 200 produces a beam 202 of infrared radiation that is optionally steered by one or more mirrors 204 and/or other beam conditioning optics (not shown) before being focused by a focusing optic 206 to a focused spot 208 of a sample 210 mounted on a substrate 212. Focusing optic 206 is illustrated in FIG. 2 as a simple lens, but in various alternative embodiments it may take the form of either one or a collection of lenses, mirrors, or other steering or focusing optics that can include, among others, a reflective objective of a Schwarzschild/Cassegrain design, an off-axis parabolic mirror, a refractive infrared objective or any other collection of optics capable of creating a spot of infrared light on the sample. In some embodiments, no infrared focusing optic may be required, e.g. in the case that the IR source 200 is sufficiently intense and/or it is desired to illuminate a larger region of the sample, for example for widefield OPTIR measurements.

A probe beam source 220 creates a probe beam 222 with a wavelength generally shorter than the wavelength of the probe beam 202 generated by the IR source 200. Probe beam source 220 generally emits a probe beam 204 having one or more wavelengths in the UV/visible and/or near-IR wavelengths, for example between 250 nm and 800 nm, although shorter or longer wavelengths could be used. Probe beam 222 passes optionally passes through a waveplate and/or polarizer 224 to select a desired polarization for the incoming beam. The probe beam can also pass through other beam conditioning optics, for example a beam expander, attenuator, and/or spatial filter (not shown) to generate a beam of desired intensity, size, and mode quality.

After passing through polarization control and beam conditioning, the probe beam is directed towards non-polarizing beam splitter 226 which divides the beam onto two paths. One path 228 that is directed towards the sample and another path 232 that is directed towards a reference reflector 236. Reference reflector 236 can optionally be moved by one of more actuators 237 to change the angle and/or position of the reference reflector 236, for example to aid in alignment of the interferometer and/or to adjust the relative optical phase of the interferometer, as will be discussed later.

Optional shutter/beam block 234 can be used to block the reference beam when it is desired to perform non-interferometric measurements, or for certain calibration measurements, and/or to keep the bright reference beam from overwhelming a viewing camera in some configurations.

The portion of beam 222 that is deflected by non-polarizing beam splitter 226 onto path 228 is focused by a focusing optic 230 to create a focused spot 231 on sample 210 (see FIG. 1C). A portion of probe light is reflected/back-scattered from the sample back to focusing optic 230 which now acts as a collection objective. The collected probe light is recollimated and directed back on path 228 back to non-polarized beam splitter 226. Non-polarizing beam splitter again the divides the light onto two paths, one path back towards probe light source 220 which will be ignored in this discussion, and the other on path 238 in the detector arm of the interferometer.

A secondary reflection 233 returns from the interface between sample 210 and substrate 212 and is also collected by focusing optic 230 as described in the previous paragraph. As described associated with FIG. 1B-D, this secondary reflection could normally interfere with the beam returning from the sample and cause interference fringes to occur in OPTIR images due to OPTIR sensitivity having an oscillatory dependence on the thickness of sample 210. To overcome this issue, the reference reflector 236 can be chosen to be sufficiently reflective such that the intensity on the reference arm of the interferometer is much larger than the intensity of a substrate reflection 233. For example in the case of a polystyrene sample on a calcium fluoride flat, the primary reflection from the top polystyrene surface is around 4.9% of the incoming probe beam, and the reflection from the substrate is around 0.18%. These reflectivities depend on the relative index of refraction the sample surrounding medium (e.g. air in this case), the sample, and the underlying substrate according to Fresnel reflectivity formulas. To swamp the substrate reflectivity, it is desirable that the reference beam be much more intense than 0.18% of probe beam incident on the sample. In practice, a highly reflective mirror, e.g. >90% can produce a reference beam that is ~500× brighter than the substrate reflection beam. This reference beam is also about 18× brighter than the reflection from the sample and hence provides a measurement sensitivity enhancement as described in U.S. Pat. No. 11,480,518B2, hereby incorporated by reference in its entirety. In practice it is desirable that the reference beam be at least 10× higher than any secondary reflection from the sample.

Optional waveplate 234 is included in the reference beam path to adjust the polarization of the reference beam to achieve quadrature interferometric detection, as described in more detail below. The sample reflected beam on path 228 and reference beam on path 232 are recombined by non-polarizing beam splitter 226 onto path 238 where the combined beam optionally passes through another waveplate 240 before being divided by polarizing beam splitter 242 onto two detector paths: path 244 to detector 248 and path 246 to detector 250. By use of appropriate wave plates and rotation angles, detectors 248 and 250 can be arranged in "quadrature" i.e. such that the relative optical phase of the interferometer is offset by roughly 90° between the two detectors. It is also possible to use three or four detectors in alternate quadrature arrangements. Beam splitter 242 is illustrated as a beam splitting cube, but it could instead be a Wollaston prism or other prism that splits light based on polarization. The Wallaston prism approach can be advantageous because it can arrange for the two detectors to be in the same plane, for example two segments of a split segment photodiode or diode array.

The two detectors 248 and 250 produce signals 252 and 254 that can optionally be sent to one or more signal processors to perform various demodulation and signal combination steps. For example the signal processor(s) can comprise demodulator 256 and CPU 260. Demodulator 256, for example a lock-in amplifier, to demodulate a signal indicative of change in collected probe light due a photo-thermal distortion in the sample from the absorption of infrared radiation. In this embodiment, output signals 258 from the demodulator 256 are combined by processor/CPU 260 into a composite signal that is substantially insensitive to the relative optical phase between the sample and the reference mirror. From this phase insensitive signal OPTIR images 262 and spectra 264 can be generated where unwanted interference effects from the sample substrate reflection are substantially suppressed. The following sections will detail how the interferometer may be constructed for quadrature detection, how the phase-insensitive composite signal is constructed and how the unwanted interference is suppressed.

Quadrature Detection

In various embodiments, the interferometer of FIG. 2 can be configured to split the interfering light between two detectors 248 and 250 and arranged such that the interfering light at detector 246 and detector 250 have an optical phase shift relative to each other. In a preferred embodiment, the two detectors are arranged to be in "quadrature" such that there is a relative optical phase of around 90° between the two detectors. This can be achieved in a variety of ways. Three such ways are described in references: (1) Y. Elsworth and J. James, "An optical screw with a pitch of one wavelength," Journal of Physics E: Scientific Instruments 1973 Volume 6; (2) M. Doboszy, T. Usuda and T. Kurosawa, in "Methods for the calibration of vibration pick-ups by laser interferometry: I. Theoretical analysis," Meas. Sci. Technol. 9 (1998) 232-239; and (3) P. Gregorčič et al "Quadrature phase-shift error analysis using a homodyne laser interferometer (Optics Express Vol. 17, Issue 18, pp. 16322-16331 (2009)), each of which are incorporated herein by reference in their entireties.

For example, the initial probe beam 222 can have its polarization rotated by 45° before reaching beam splitter 226. This can be achieved for example using a polarizer or half wave plate 224 or by rotating the probe beam light source 220. Next, recombined beam 238 on the return path to the detectors 248/250 is split by a second beam splitter 242 to send a first portion 244 of recombined beam 238 to a first detector 248 and a second portion 246 of recombined beam 238 to a second detector 250. The beam splitter 242 can be a polarizing beam splitter such that light of one polarization proceeds on path 244 to detector 248 and light of the other polarization proceeds on path 246 to detector 250.

In one embodiment, for example, using the approach of Gregorčič, wave plate 234 in the reference arm along path 232 can be an eighth wave and the polarization of the input beam is arranged at 45° with respect to the fast axis of the eighth wave plate. Light returning from the sample arm on path 228 will contain both polarizations, but it will have accumulated a total of a 90° optical phase difference between the two polarizations. Polarizing beam splitter 242 then divides this light onto two paths 244 and 246. Interference between the sample and reference beams occurs on both paths 244 and 246, but the two interfering paths are nominally 90° out of optical phase with each other. The two detectors 248 and 250 then record so-called quadrature versions of the interferometric signal. Alternatively, wave plates 234 and 248 can be quarter wave plates rotated at approximately 22.5° and 45° respectively as described by Y. Elsworth and J. James in "An optical screw with a pitch of one wavelength," Journal of Physics E: Scientific Instruments 1973 Volume 6.

The net result is that the two detectors 248 and 250 collect an intensity of light that is dependent on the optical phase difference between the reference arm and sample arm of the interferometer, but that their outputs are offset by 90°, as illustrated in plot 266 at the bottom of FIG. 2.

As will be discussed later, it is possible to combine the outputs of these two so-called quadrature signals $I_1$ and $I_2$ to construct a composite output signal that is indicative of IR absorption of the sample yet substantially independent of a relative optical phase of between both the sample and the underlying substrate, as well as the optical phases between the sample, substrate, and the reference mirror of the interferometer. Because the composite signal is phase insensitive, it is no longer necessary to measure or stabilize the phase of the interferometer, thus making the interferometer more robust and vibration insensitive.

Figure 3:
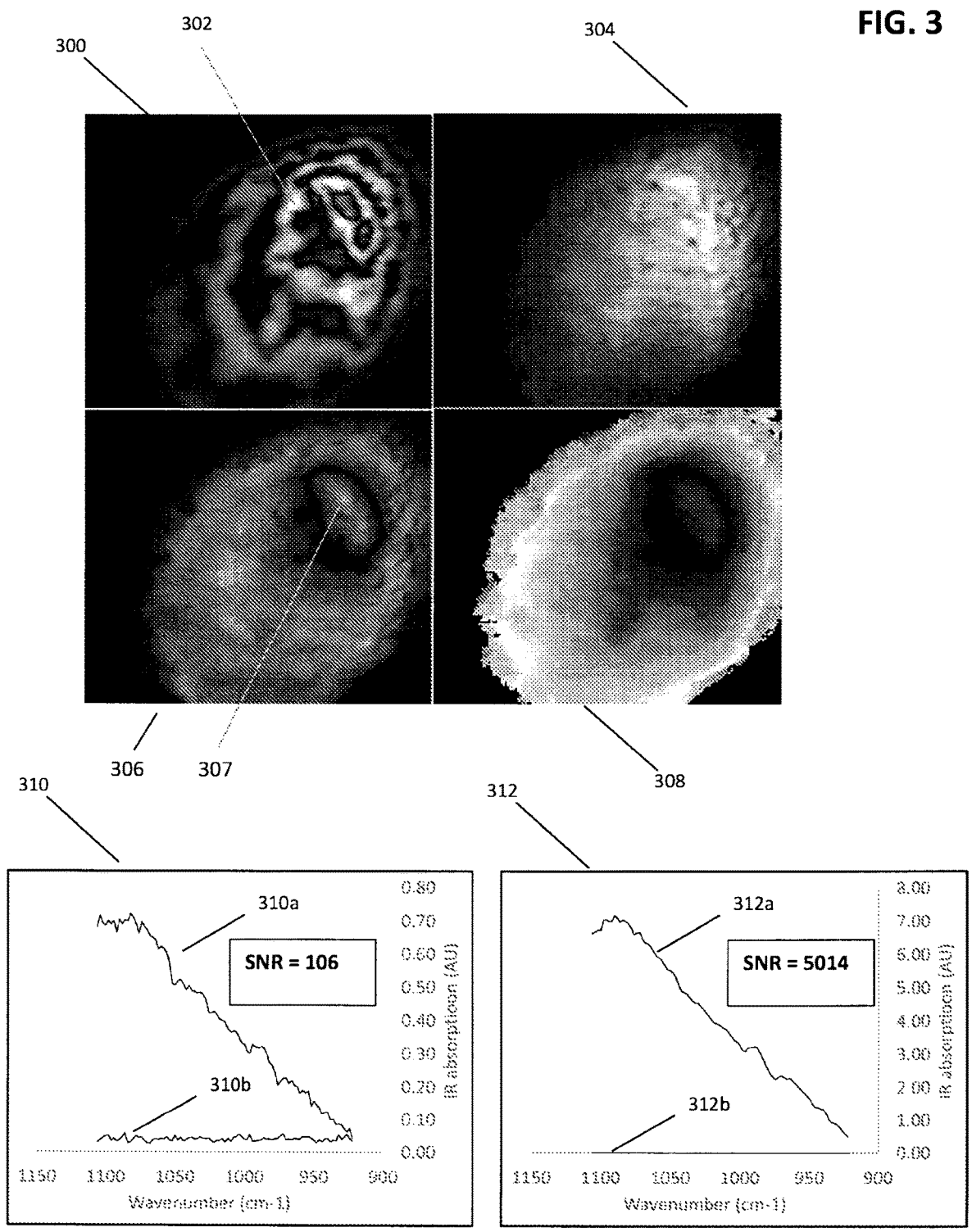
FIG. 3 illustrates suppression of thin film interference using the asymmetric interferometer of FIG. 2, further illustrating thermal decay frequency dependent signal-to-noise ratio improvement.

FIG. 3 shows some representative photothermal infrared absorption images created using the apparatus of FIG. 2 as compared to measurements performed using a conventional interferometer. Image 300 is a photothermal infrared absorption image of a biological cell imaged on a transparent substrate. Image 300 has alternating rings 302 of bright and dark shading that correspond to regions of increased and decreased OPTIR sensitivity as a function of the cell height due to thin film interference between the cell sample and the underlying substrate. The top right image 304 was taken using the improved apparatus of FIG. 2 using a two-channel lock-in amplifier as DEMOD/DAQ module 256 of FIG, and composite signal 258 was constructed using an RMS sum of lock-in Y channel output associated with demodulating signals from quadrature detectors 248 and 250 at the fundamental frequency of the IR excitation, e.g. the at the pulse repetition rate of the IR source. The mathematical explanation of this composite signal is detailed below, but note the absence of interference rings in image 304 using this composite signal as compared to prior art image 300.

The use of the device of FIG. 2 and the composite signal has led to almost complete suppression of thin film interference effects and a much more accurate representation of the strength of IR absorption in this cell sample. Image 306 shows the creation of another composite signal, this time from the RMS sum of the lock-in X channels for the two quadrature detectors. In this case, the lock-in X channel is detecting the dynamic phase response of the sample at twice the IR excitation frequency, compared to image 304 detected at the fundamental excitation frequency. The two measurements 304 and 306 provide information about the frequency dependence of the photothermal response of the sample and can insights about heterogeneity in other physical properties of the sample. Image 306 appears to show substantial contrast around the cell nucleus 307 that is not visible in image 304, potentially due to different thermal decay properties between the cell nucleus and the cytoplasm that are revealed at the higher excitation frequencies.

Image 308 shows a composite image created using the ratio of image 306 to 304. Plots 310 and 312 illustrate IR absorption spectra obtained using a conventional interferometer compared with the improvement achieved with the apparatus of FIG. 2. Plot 310 shows an IR absorption of a biological cell under the same condition as image 300 above. Trace 310a show a conventional OPTIR lock-in amplitude over a plurality of wavelengths of IR light where the cell in question had relatively small IR absorption. Trace 310b shows the same signal measured with the IR beam blocked and is hence indicative of the noise in the measurement. The data in plot 310 provides a maximum signal-to-noise ratio (SNR) of around 106.

Plot 312 shows a measurement of an IR absorption spectrum 312a and noise trace 312b using the apparatus of FIG. 2 where the signal plotted is the RMS sum of lock-in outputs from DEMOD/DAQ 256 using inputs from quadrature detectors 248 and 250. The asymmetric interferometric arrangement of FIG. 2 provides substantial amplification of the dynamic photothermal signal leading to much higher SNR around 5014. Thus the arrangement of FIG. 2 has provided 50× improvement in SNR over conventional OPTIR measurements.

Mathematical Justification for Thin Film Interference Suppression and Phase Insensitivity The following section describes how the current method and apparatus constructs a photothermal that is substantially independent of the relative phase between the sample and the underlying substrate. FIG. 2 also shows three arrows labeled $I_{sam}$, $I_{sub}$, and $I_{ref}$ which represent the probe light intensity reflected from the sample 210, the substrate 212, and reference reflector 236, respectively. When these beams recombine on path 238, the interfering intensity $I_1$ sensed at one of the detectors 248 or 252 is given by:

$$I_1 = I_{sam} + I_{sub} + I_{ref} + 2\sqrt{I_{sam}I_{sub}}\cos\left(\frac{4\pi h}{\lambda}\right) + 2\sqrt{I_{ref}I_{sam}}\cos\phi_{refsam} + 2\sqrt{I_{ref}I_{sub}}\cos\phi_{refsub} \quad \text{Eq. 5}$$

where $\phi_{refsam}$ and $\phi_{refsub}$ are the relative phases between the reference reflector and the sample and the reference reflector and the substrate. A similar formula will dictate the intensity $I_2$ at the other quadrature detector, but with sine terms replacing cosines in the last two terms. Recalling that the reference reflector is arranged to produce a beam with intensity $I_{ref} \gg I_{sub}$ and that for appropriate selection of a substrate, $I_{sam} \gg I_{sub}$, $I_{d1}$ can be approximated by:

$$I_1 = I_{ref} + 2\sqrt{I_{ref}I_{sam}}\cos\phi_{refsam} \quad \text{Eq. 6}$$

where the interference cross-terms between the sample and substrate and substrate and reference beam have been neglected. This is a valid approximation when the reflected reference beam has an intensity $I_{ref}$ that at least 10× stronger than that of the secondary reflection from the sample substrate $I_{sub}$. Note also that $I_{sub}$ may refer to a secondary reflection from a second surface within a sample, for example a second surface in a laminated polymer sample, or a secondary scattering surface in a cell, for example the nucleus. At a second detector in quadrature with the first, the signal intensity $I_2$ is given by:

$$I_2 = I_{ref} + 2\sqrt{I_{ref}I_{sam}}\sin\phi_{refsam} \quad \text{Eq. 7}$$

Thus the signal at the two detectors is substantially independent of the substrate reflectivity and relative phase between the sample and substrate. A plot 266 of the signals from Eqs. 6-7 is shown in FIG. 2. Equations 6 and 7 indicate the instantaneous detector signals. From these signals it is desirable to extract a signal that in indicative of the infrared absorption of the sample.

Absorption of IR light at the sample 210 will produce a thermal expansion in sample 210 that changes the relative optical phase $\phi_{refsam}$ between the sample and the reference reflector. In the case of detection of the transmitted beam, absorption of IR light can also induce a phase change due to the change in index of refraction of the sample through which the probe beam transmits. In either case, it is desirable to detect a dynamic change in the optical phase associated with absorption of IR light. In the case that the IR absorption is periodic in time, i.e. in response to periodic pulses from IR source 200, the optical phase $\phi_{refsam}$ as a function of time can be written as:

$$\phi_{refsam} = \theta + \psi(t) \quad \text{Eq. 8}$$

Where $\theta$ represents the DC phase of the interferometer between the reference mirror and sample, $\psi(t)$ is the time varying change in the phase induced by IR absorption.

It is desirable to extract the amplitude $\psi$ as it is indicative of the IR absorption of the sample. Unfortunately, the detector signals $I_1$ and $I_2$ have a strong dependence on the DC optical phase term $\theta$, which is often unstable over time, especially absent a phase feedback loop. The scheme described below enables extraction of the photothermal phase modulation amplitude $\psi$ without needing to control the DC phase $\theta$. Instead the process outlined below enables dynamic measurement of the DC phase $\theta$, and then use of this information to extract the photothermal modulation amplitude $\psi$.

First, inserting equation 8 for the dynamic phase $\phi$ into equations 6 and 7:

$$I_1 = I_{ref} + 2\sqrt{I_{ref}I_{sam}}\cos(\theta + \psi(t)) \quad \text{Eq. 9}$$

$$I_2 = I_{ref} + 2\sqrt{I_{ref}I_{sam}}\sin(\theta + \psi(t)) \quad \text{Eq. 10}$$

Equations 9 and 10 can be rewritten using trigonometric multi-angle formulas as:

$$I_1 = I_{ref} + 2\sqrt{I_{ref}I_{sam}} (\cos\theta \cos(\psi(t)) - \sin\theta \sin(\psi(t))) \quad \text{Eq. 11}$$

$$I_2 = I_{ref} + 2\sqrt{I_{ref}I_{sam}} (\sin\theta \cos(\psi(t)) + \cos\theta \sin(\psi(t))) \quad \text{Eq. 12}$$

Next, consider the case where the photothermal phase modulation has the form:

$$\psi(t) = \psi_0 \sin\omega t \quad \text{Eq. 13}$$

where $\omega$ is the angular frequency associated with the IR source modulation, i.e. $\omega = 2\pi f_r$, where $f_r$ is for example the repetition rate of a pulsed IR laser source or the modulation frequency of a chopper or other modulator used to modulate the IR intensity. Often the photothermal phase modulation will contain multiple harmonics, i.e. integer multiples of the angular frequency $\omega$, but for a sufficiently high pulse repetition/modulation rate, most of the energy will be in the fundamental frequency $\omega$. Note there may also be a phase offset in the sine term of Eq. 13 which will be ignored for now, but will be addressed later. Inserting Eq. 13 into Eqs. 11-12 gives:

$$I_1 = I_{ref} + 2\sqrt{I_{ref}I_{sam}} (\cos\theta \cos(\psi_0 \sin\omega t) - \sin\theta \sin(\psi_0 \sin\omega t)) \quad \text{Eq. 14}$$

$$I_2 = I_{ref} + 2\sqrt{I_{ref}I_{sam}} (\sin\theta \cos(\psi_0 \sin\omega t) + \cos\theta \sin(\psi_0 \sin\omega t)) \quad \text{Eq. 15}$$

Next Jacobi-Anger expansions can be used to approximate the terms involving $\cos(\psi_0 \sin\omega t)$ and $\sin(\psi_0 \sin\omega t)$. Specifically:

$$\cos(\psi_0 \sin\omega t) \approx J_0(\psi_0) + 2J_2(\psi_0) \cos 2\omega t \quad \text{Eq. 16}$$

$$\sin(\psi_0 \sin\omega t) \approx 2J_1(\psi_0) \sin\omega t \quad \text{Eq. 17}$$

Where $J_0(\psi_0)$, $J_1(\psi_0)$, and $J_2(\psi_0)$ are Bessel functions of the 1st kind.

Plugging Eqs. 16 and 17 into Eqs. 11 and 12 gives:

$$I_1 = I_{ref} + I_{sam} + 2\sqrt{I_{ref}I_{sam}} (\cos\theta (J_0(\psi_0) + 2J_2(\psi_0) \cos 2\omega t) - 2\sin\theta J_1(\psi_0) \sin\omega t) \quad \text{Eq. 18}$$

$$I_2 = I_{ref} + I_{sam} + 2\sqrt{I_{ref}I_{sam}} (\sin\theta (J_0(\psi_0) + 2J_2(\psi_0) \cos 2\omega t) + 2\cos\theta J_1(\psi_0) \sin\omega t) \quad \text{Eq. 19}$$

The terms of Eqs. 18 and 19 can be broken down to examine different frequency components that would be measured by a frequency domain demodulator, for example using a lock-in amplifier. Both equations have DC terms, and then oscillatory components at $\omega$ and $2\omega$. Below are the different frequency terms of $I_1$ at detector 248 where $I_{10}$ is the DC term, $I_{11}$ is the $\omega$ term and $I_{12}$ is the $2\omega$ term.

$$I_{10} = I_{ref} + I_{sam} + 2\sqrt{I_{ref}I_{sam}} J_0(\psi_0) \cos\theta \quad \text{Eq. 20}$$

-continued $$I_{11} = -\sqrt{I_{ref}I_{sam}} J_1(\psi_0) \sin\theta \sin\omega t \quad \text{Eq. 21}$$

$$I_{12} = \sqrt{I_{ref}I_{sam}} J_2(\psi_0) \cos\theta \cos 2\omega t \quad \text{Eq. 22}$$

Each of these terms are readily extractable from a multi-frequency lock-in. For example, lock-in X and Y channels (in phase and quadrature signals, which are proportional to $\cos\omega t$ and $\sin\omega t$, respectively), can be used extract the AC components as $$I_{11y} = -\sqrt{I_r I_s} J_1(\psi_0) \sin\theta \quad \text{Eq. 23}$$

$$I_{12x} = \sqrt{I_r I_s} J_2(\psi_0) \cos\theta \quad \text{Eq. 24}$$

Where $I_{11y}$ is the lock-in Y component at frequency $\omega$ and $I_{12x}$ is the lock-in X channel at $2\omega$. Any non-zero phase offset in the sine term of Eq. 13 can be nulled with a reference phase offset in the lock-in amplifier.

Similarly, the expressions for the signals at the quadrature detector 250 can be written as:

$$I_{20} = I_{ref} + I_{sam} + 2\sqrt{I_{ref}I_{sam}} J_0(\psi_0) \sin\theta \quad \text{Eq. 25}$$

$$I_{21} = \sqrt{I_{ref}I_{sam}} J_1(\psi_0) \cos\theta \sin\omega t \quad \text{Eq. 26a}$$

$$I_{22} = \sqrt{I_{ref}I_{sam}} J_2(\psi_0) \sin\theta \cos 2\omega t \quad \text{Eq. 26b}$$

And the lock-in signal components for the second (quadrature) detector 250:

$$I_{21y} = \sqrt{I_{ref}I_{sam}} J_1(\psi_0) \cos\theta \quad \text{Eq. 27}$$

$$I_{22x} = \sqrt{I_{ref}I_{sam}} J_2(\psi_0) \sin\theta \quad \text{Eq. 28a}$$

Because the photothermal modulation amplitude $\omega_0$ is typically very small ($<<1$), it is possible to approximate the Bessel function $J_1(\psi_0)$ with a simple linear expansion: $J_1(\psi_0) \approx \psi_0/2$. Thus Eq. 23 and 27 can be rewritten as:

$$I_{11y} = -\sqrt{I_{ref}I_{sam}} \frac{\psi_0}{2} \sin\theta \quad \text{Eq. 28b}$$

$$I_{21y} = \sqrt{I_{ref}I_{sam}} \frac{\psi_0}{2} \cos\theta \quad \text{Eq. 29}$$

A composite signal can be constructed using RMS sum of Eqs. 28 and 29:

$$\sqrt{(I_{11y})^2 + (I_{21y})^2} = \sqrt{I_{ref}I_{sam} \frac{\psi_0^2}{4} (\sin^2\theta + \cos^2\theta)} = \frac{\psi_0}{2} \sqrt{I_{ref}I_{sam}} \quad \text{Eq. 30}$$

using the trigonometric identity $\sin^2\theta + \cos^2\theta = 1$. Solving Eq. 30 for $\psi_0$ gives:

$$\psi_0 = \psi_0(\lambda) = \frac{2\sqrt{(I_{11y}(\lambda))^2 + (I_{11y}(\lambda))^2}}{\sqrt{I_{ref}I_{sam}}} \quad \text{Eq. 31}$$

The summary result from Eq. 31 is that a composite signal that is proportional to the photothermal phase modulation can be constructed by the RMS sum of the lock-in Y channels for the in phase and quadrature detectors divided by the square root product of the DC intensities from the sample and reference reflector. Eq. 31 has been written to explicitly show which terms have a dependence of the IR excitation wavelength 2. Images indicative of IR absorption 262 by the sample can be generated by plotting the signal of Eq. 31 as a function of XY sample position.

Similarly, spectra 264 indicative of sample IR absorption as a function of wavelength can created by measuring the signal, as a function of IR excitation wavelength. For this embodiment, DEMOD/DAQ 256 can comprise a multi-channel lock-in amplifier with at least two signal inputs and can provide separate demodulation for the two detectors 248 and 252. The two terms in the denominator $I_{ref}$ and $I_{sam}$ can be measured in a few different ways, if desired. First, it is possible to provide an intentional modulation of the DC phase θ, for example using a piezo actuator to move a reference reflector to change the optical path length. Recording one or both of DC signals from detectors 248 and 250 while modulating the DC phase θ with sufficiently large amplitude will show a modulation amplitude that is proportional to the denominator in Eq. 31. This is apparent from Eqs. 6-7 and illustrated in plot 266 in FIG. 2 because for sufficient large excursion of the DC phase θ (for example) 180° the sine and cosine terms of Eqs 6-7 will oscillate between ±1 and thus the peak-to-peak amplitude of the quadrature detector oscillation will be $4\sqrt{I_{ref}I_{sam}}$. Thus by modulating the DC phase, for example with actuator 237 in FIG. 2, it is possible to extract a measurement of the denominator in Eq. 31 by recording the peak to peak excursions of one or more detector signals 252 and 254.

It is also possible to construct a signal indicative of IR absorption without directly measuring $I_{ref}$ or $I_{sam}$. The reference intensity $I_{ref}$ is essentially a constant and so in practice only $I_{sam}$ needs to be considered. The term $I_{sam}$ represents the intensity of light reflected/scattered from the sample and in practice depends on variations in reflectivity, surface angle and surface roughness of the sample. But these properties are independent of the IR excitation wavelength used. The IR wavelength dependence in Eq. 31 is only in the two detector lock-in outputs $I_{11y}$ and $I_{21y}$. So by acquiring IR absorption images 262 at two (or more) images at different IR excitation wavelengths of the IR source 200, it is possible to calculate a ratio of two images that cancels out the $\sqrt{I_{ref}I_{sam}}$ term in the denominator of Eq. 31.

In the example above in Eqs. 13-31 it was assumed for simplicity that the photothermal response was proportional to sin ωt with no phase shift (or equivalently no cos ωt component.) Real world materials and systems may include a delay between the start of an IR pulse and the peak photothermal response such that the photothermal phase modulation ψ(t) may have the form:

$$\psi(t) = \sum_{m=1}^{n} \psi_{m=1} \sin(m\omega t + \gamma_m) \quad \text{Eq. 32}$$

In this case, a similar analysis to that above can be performed to extract the harmonic amplitude and phase components $\psi_m$ and $\gamma_m$ using lock-in amplifier signals at one or more different harmonic frequencies mω. As before, the lock-in amplifier components from the two quadrature detectors can be combined to make one or more composite signals that are indicative of IR absorption, yet insensitive to the DC phase between the sample and the reference reflector. Measuring lock-in components at higher frequencies in some cases can provide higher spatial resolution and/or discrimination between regions of a sample with different thermal decay times.

Figure 4:
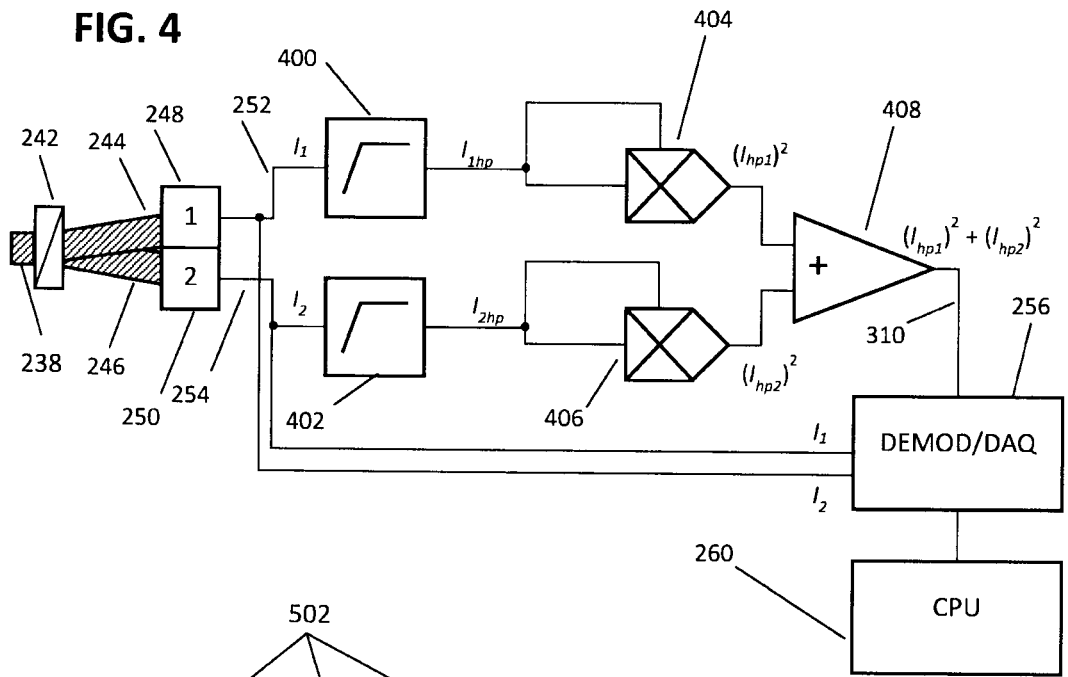
FIG. 4 illustrates an alternative embodiment for thin film interference suppression in OPTIR using asymmetric quadrature interferometry.

FIG. 4 illustrates a method and apparatus that can create a composite photothermal signal that suppresses thin film interference effects and is also insensitive to the DC phase between the sample and the reference reflector, but without requiring a multi-channel lock-in. This approach also works with an arbitrary dynamic photothermal phase modulation ψ(t) and does not assume a sinusoidal response. Returning to Eqs. 11-12, it can be assumed that the dynamic phase change ψ(t)≪1. This is justified both in reflection and transmission in most cases because the dynamic phase change that arises from thermal expansion and/or change in index of refraction are of order $10^{-4}$/K for most polymeric/biological materials, and even smaller for inorganic materials. Thus for a material with a thickness of 5 μm, a typical thermal expansion with 1K of temperature rise would be 0.5 nm, and this thermal expansion is much smaller than the wavelength of probe light (e.g. 532 nm), thus the dynamic phase change $$\psi(t) = \frac{4\pi\Delta h(t)}{\lambda} \ll 1,$$

where Δh(t) represents the sample thermal expansion. Because ψ(t)≪1 small angle approximations can be used for the cos (ψ(t)) and sin (ψ(t)) terms in Eqs 11-12. Specifically for small angle δ, sin δ≈δ and cos δ≈1. Eqs. 11 and 12 thus simplify to:

$$I_1 = I_{ref} + 2\sqrt{I_{ref}I_{sam}}(\cos\theta - \psi(t)\sin\theta) \quad \text{Eq. 33}$$

$$I_2 = I_{ref} + 2\sqrt{I_{ref}I_{sam}}(\sin\theta + \psi(t)\cos\theta) \quad \text{Eq. 34}$$

A composite signal that is insensitive to the DC phase θ can be created by constructing the RMS sum of the time varying components of $I_1$ and $I_2$. So for example using a high pass filter or level shifter to block the constant DC terms, the time varying/high pass filtered signals from detectors 248 and 250 are given by:

$$I_{1hp} = -2\sqrt{I_{ref}I_{sam}}\psi(t)\sin\theta \quad \text{Eq. 35}$$

$$I_{2hp} = 2\sqrt{I_{ref}I_{sam}}\psi(t)\cos\theta \quad \text{Eq. 36}$$

Squaring Eq. 15 and Eq. 16 and adding them gives:

$$I_{1hp}^2 + I_{2hp}^2 = 4I_{ref}I_{sam}\psi^2(t)\left(\sin^2\theta + \cos^2\theta\right) = 4I_{ref}I_{sam}\psi^2(t) \quad \text{Eq. 37}$$

(using the trigonometric identity $\sin^2\theta + \cos^2\theta = 1$)
Solving for ψ(t):

$$\psi(t) = \sqrt{\frac{I_{1hp}^2 + I_{2hp}^2}{4I_{ref}I_{sam}}} \quad \text{Eq. 38}$$

Eq. 38 represents a composite signal that allows determination of an arbitrary dynamic photothermal phase change $\psi(t)$ without pre-assuming any sinusoidal or other periodic form. This composite signal provides a signal that is indicative of absorption of IR light by the sample without requiring any knowledge of the DC phase of the interferometer and this signal substantially suppresses thin film interference effects from secondary reflections from the substrate. Because this composite signal does not depend on the DC phase $\theta$, the measurement is largely insensitive to vibration and thermal drift between the sample and the reference reflector, at least as long as the noise and vibration is below the pulse repetition or modulation rate of the infrared source. A typical modulation frequency for an IR source in OPTIR ranges from 50 kHz to 2 MHz, and these frequencies are well above most laboratory vibration frequencies and much faster than frequencies of thermal drift which typically occurs on the scale of seconds to hours. It is also possible to create a slightly simpler signal $\psi_m(t)$ that is still indicative of infrared absorption by omitting the square root and the scaling factor in the denominator of Eq. 38 and the square root, as shown in Eq. 39.

$$\psi_m(t) = I_{1hp}^2 + I_{2hp}^2 \qquad \text{Eq. 39}$$

The modified signal of Eq. 39 is still indicative of the IR absorption by the sample, although with a square dependence on the temperature increase in the sample. The square dependence can be corrected after data acquisition using a square root function applied by the processor/CPU 260 or other digital signal processing electronics.

The composite signal of Eq. 39 can be constructed in a number of ways. FIG. 4 illustrates one approach where the signal processor in this case uses analog multipliers and an analog summing circuit. FIG. 4 is based on FIG. 2 and where the same numeric callouts (iterated by factors of 100) are used, the discussion associated with FIG. 2 applies as appropriate.

FIG. 4 shows an embodiment of a portion of the quadrature interferometer in which a Wollaston prism is used to divide the interfering beam on path 238 onto two different paths 244 and 246 based on polarization. Light of two orthogonal polarizations are then incident one two detectors, 248 and 250, in this case illustrated as two segments of a segmented photodiode. Signals from these photodiodes 252 and 254 are optionally sent to two high pass filters 400 and 402 (or level shifters, not shown) and the filtered/shifted signals are sent to two input terminals of analog multipliers 404 and 406. Many suitable analog multipliers exist including devices like the AD834, ADL53991, HA-2556, AD835 and many others. In some cases, an RF mixer can also work as a suitable multiplier. A summing circuit 408 is then used to create the squared sum signal of Eq. 19. This composite signal 410 is then sent to DEMOD/DAQ module 256 which can comprise a lock-in amplifier and/or a data acquisition module. In the case that the DEMOD/DAQ module comprises a lock-in amplifier, the lock-in can demodulate variations the composite signal 410 at frequencies corresponding to pulse repetition rates or modulation frequencies of the IR source 200. Because of the squaring of the two detector signals, the first frequency component containing IR absorption information will be at twice the IR source repetition/modulation frequency, and integer harmonics thereof. For example if the IR laser modulation/repetition is at frequency f, the lock-in will generally demodulate signal 410 at any combination of frequencies of 2f, 4f, 6f etc. A square root circuit could also be used on signal 410 before the DEMOD/DAQ unit 256 in which case demodulation would occur at frequencies off, 2f, 3f etc. Suitable circuits for calculating square roots are described for example in Selvam and Latha, A Simple Square Rooting Circuit Based on Operational Amplifiers (OPAMPs) 3 Eng. Tech. & Applied Science Research 1 pp. 349-351 (February 2013), https://doi.org/10.48084/etasr.234.

Other applicable approaches to quadrature interferometer demodulation are described for example in the article "Robust Laser-Ultrasonic Interferometer Based On Random Quadrature Demodulation" by B.Pouet et al DOI: 10.1063/1.2184534, hereby incorporated by reference. One significant advantage of the arrangement in FIG. 4 is that the signal processor used in this embodiment can create a signal indicative of IR absorption by the sample, independent of the DC phase of the interferometer without requiring a multi-channel lock-in amplifier, as used in the embodiment in FIG. 2. The embodiment in FIG. 2 used a multi-channel lock-in to simultaneously measure the lock-in Y channel for the two quadrature detectors 248 and 250 and then performed the RMS sum on the two lock-in output signals. The embodiment of FIG. 4 performs the sum of the squares of high pass filtered detector signals prior to any demodulation and thus subsequent analysis in the time or frequency domain can occur on a single signal, eliminating the need for a multi-channel lock-in. Since multi-channel lock-in amplifiers can cost $US10,000 more than a single channel lock-in, the embodiment of FIG. 4 can be especially advantageous.

Figure 5:
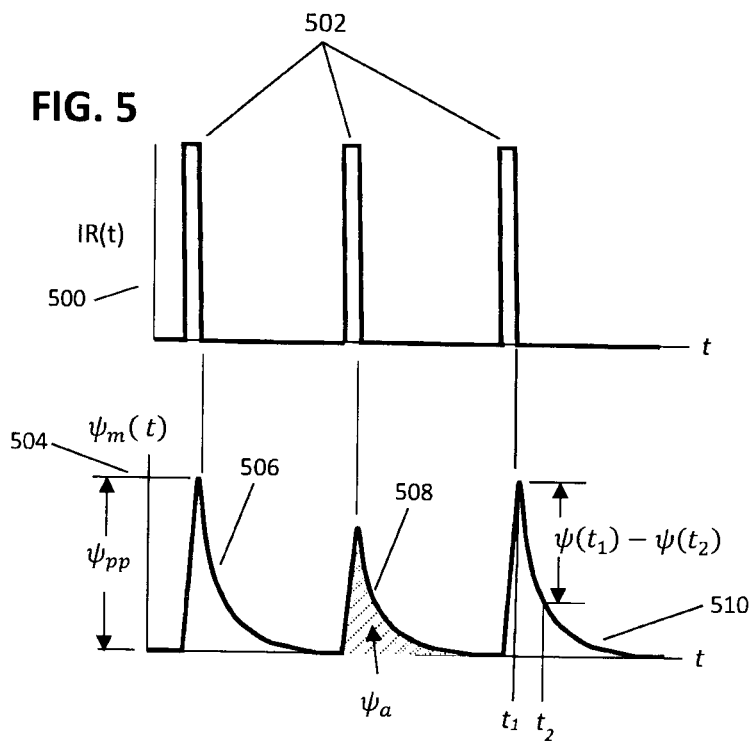
FIG. 5 depicts dynamic photothermal responses and is used to demonstrate methods of time-domain demodulation of a transient photothermal signal.

The signal processing of FIG. 4 can also be implemented using a time domain demodulation approach, as illustrated in FIG. 5. FIG. 5 illustrates examples of the composite dynamic photothermal signal $\psi_m(t)$ as constructed using the apparatus and method described associated with FIG. 4. FIG. 5 shows a first plot 500 with a series of three IR pulses 502. The lower plot 504, which is aligned with the upper plot along a common time axis, illustrates example dynamic photothermal responses 506, 508, 510 to the IR pulses above, along with three methods of extracting a measurement of an amplitude of the photothermal signal $\psi_m(t)$. This time domain approach has an advantage in some cases over the embodiments of FIG. 4. The high pass filters 400/402 of FIG. 4 will generally set the average value of $\psi_m(t)$ to zero, which can work well for low duty cycle applications where the AC transient is a small/brief perturbation from the average. But in the case of a high duty cycle signal, setting the average value of $\psi_m(t)$ to zero (as accomplished by a high-pass filter) is not the same as removing the DC components as discussed associated with Eqs. 33-36. In the case of a high duty cycle photothermal transient, a high-pass filter can shift the output signal such that equal portions of the photothermal transient is above and below the zero line, resulting in errors in the quadrature calculation. To overcome this issue, it can be desirable to use a level shift in place of a high pass filter to shift the minimum or maximum signal to zero. This will ensure that the output transient photothermal signal is always positive or always negative, which can provide a more accurate quadrature calculation.

FIG. 5 illustrates a time domain demodulation approach that involves a DC level shift instead of a high pass filter. The top plot in FIG. 5 illustrates simplified intensity profiles of IR light striking the sample and the lower plot illustrates example transient photothermal response to the absorption of IR light, where in this case the minimum value of the photothermal signal $\psi_m(t)$ has been level shifted to zero. In each IR pulse 502 there is a sharp signal rise of the signal ψ$_m$(t) at the onset of each IR pulse, followed by an exponential decay. The exponential decay generally has a time constant dependent on thermomechanical properties of the sample, for example thermal conductivity, heat capacity, and density (as well as details of thermal contact to any surrounding media/contact with underlying substrate). In this case the photothermal transient is illustrated as having a positive sign, but in many cases the photothermal transient will be inverted, i.e. absorption of IR light will lead to a reduction in collected probe light, so that the photothermal transient is negative, i.e. the signals in the lower plot 504 would be inverted in the vertical direction. In this case, the level shifter would shift the maximum signal to the zero baseline.

Measurements indicative of IR absorption of the sample can be constructed by analyzing one or more transient responses like 506, 508, 510 by one or more different methods. For transient response 506, the illustrated measurement is a peak-to-peak measurement, i.e. the maximum signal within a given time window minus the minimum. For transient response 508, the plot illustrates creating a measurement that integrates the area $\psi_a$ under the transient response. For transient response 510, the diagram illustrates making a differential measurement between two specified times. For better signal-to-noise, it is possible to synchronously average a series of transient response pulses before applying the amplitude measurement and/or averaging the measurements over a number of transient response pulses. It is also possible to perform a Fourier transform on the data and extract the amplitudes of one or more Fourier components to construct a measurement indicative of IR absorption by the sample.

In any of the cases above, the transient signal amplitudes can then be squared and summed digitally, for example using a computer, CPU, field programmable gate array, digital signal processor, graphics processing unit or any other suitable computation means in a way equivalent to the analog computation shown in FIG. 4, the net result being a computation substantially equivalent to that shown in Eq. 39. The computation means can also optionally take the square root to produce a signal equivalent to Eq. 38.

Note that while the embodiment shown in FIG. 2 illustrates a specific configuration, i.e. a counter-propagating geometry probe beam reflection in the reflection/backscattered direction, the methods described herein also work in alternative geometries, for example a co-propagating geometry where the IR and probe beams are focused with a common objective, and/or using transmitted probe beam detection, e.g.

Figure 6:
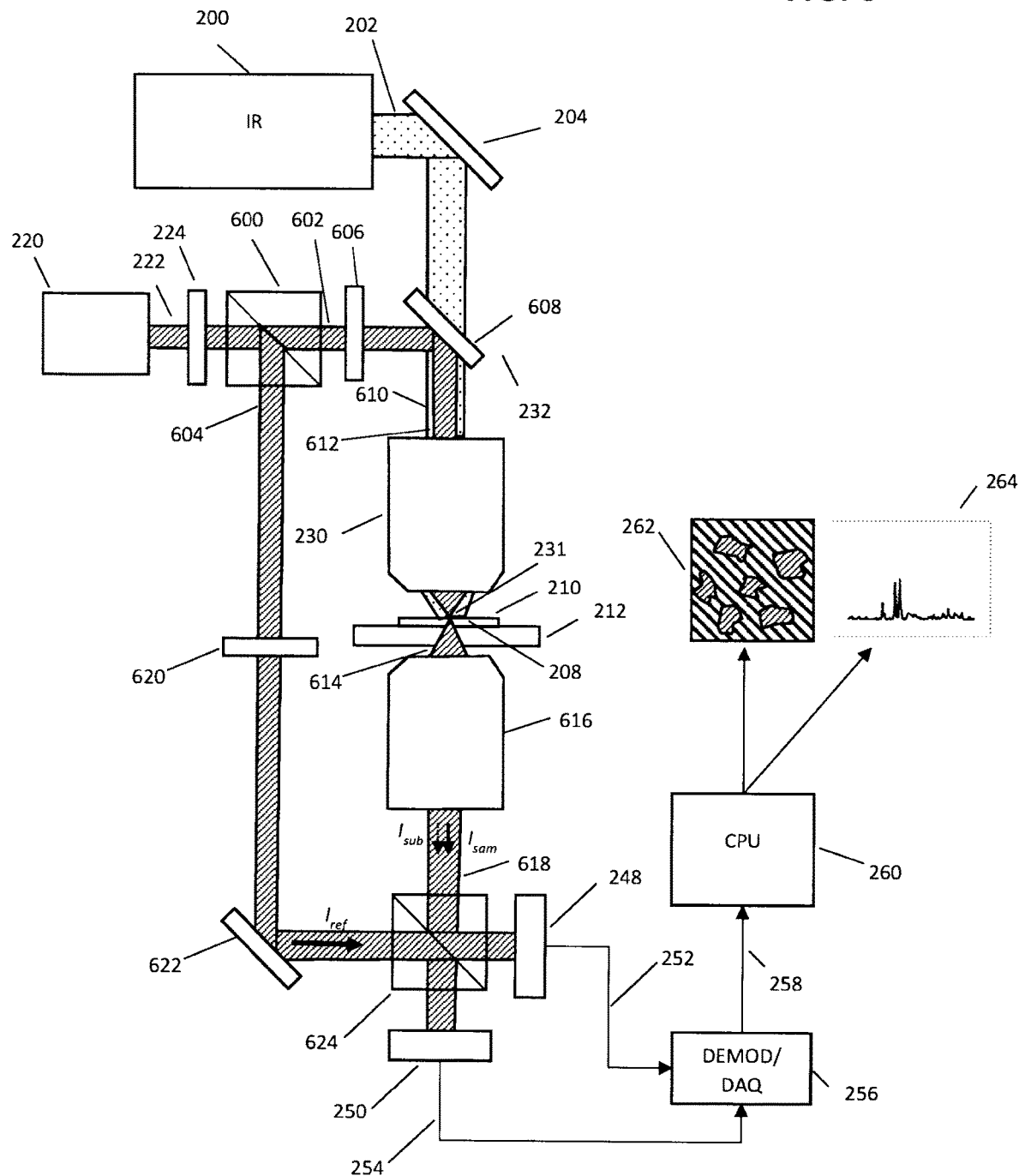
FIG. 6 depicts an alternate embodiment of an asymmetric quadrature interferometer for thin film interference suppression in a transmission detection configuration.

FIG. 6 illustrates an alternative embodiment of an asymmetric quadrature interferometer for OPTIR measurements in a transmission detection configuration. Like FIG. 2, the embodiment shown in FIG. 6 is an interferometer that enables collection of forward-scattered or transmitted light. The configuration shown in FIG. 6 is a Mach-Zehnder configuration, which includes a separate beam path for the reference arm as compared to the sample arm. This configuration can be helpful when a sample has very little reflection from the top surface, for example when the sample is immersed in a fluid. FIG. 6 also illustrates a co-propagating arrangement where the infrared and probe beams are focused onto the sample with the same objective. FIG. 6 is based on FIG. 2 and where the same numeric callouts are used (iterated by factors of 100), the discussion associated with FIG. 2 applies as appropriate. In FIG. 6 an IR source 200 emits a beam of infrared radiation 202 which is incident on optional beam steering mirror 204 and any other beam conditioning optics desired, e.g. for attenuation, beam expansion, polarization control etc. (not shown) and this then directed towards dichroic mirror 608. In the configuration shown, dichroic mirror 608 transmits IR light and reflects probe light, but the inverse configuration can also be used.

After passing the dichroic mirror 608, the IR beam is focused by focusing optic 230 onto sample 210. In this configuration, focusing optic 230 is preferably able to focus both IR and probe beams to the sample. Compensation optics (not shown) can be placed in the IR and/or probe beam paths to correct for any dispersion in focusing optic 230 between the IR and probe wavelengths. Focusing optic 230 can also be a reflective objective (i.e. of a Cassegrain/Schwarzschild design) an off-axis parabolic mirror or any other focusing optic that can focus both IR and probe beam wavelengths.

The asymmetric interferometer employed in this embodiment use a Mach-Zender interferometer configuration. Probe beam source 220 emits a beam of probe radiation 222 that optionally passes through waveplate/polarizer 224 to adjust the incoming polarization as desired. Beam splitter 600 divides the probe beam onto two paths, sample path 602 and reference path 604. The beam on sample path 602 optionally passes through an optional attenuator/waveplate 606 to adjust the probe beam power in the sample arm to provide a suitable illumination level to the sample, e.g. an illumination level that optimize SNR and is below the photodamage threshold of the sample.

There are several embodiments that can achieve the desired result. For example waveplate 224 can be a half waveplate, beam splitter 600 can be a polarizing beam splitter, and waveplate 606 can be another half waveplate. In this case, the relative angles of half waveplates 224 and 606 can be adjusted to both control the relative power of the probe beam sent to the sample and reference arms, as well as arranging the desired polarization necessary for quadrature interferometry at the detectors. Alternately, beam splitter 600 can be a non-polarizing beam splitter where a fixed fraction of light is split between sample and reference arms and element 606 can be a non-polarizing attenuator, for example a neutral density filter. A variable neutral density filter as element 606 can provide adjustability in the optical power delivered to the sample. In the case that beam splitter 600 is a non-polarizing beam splitter, it can be selected for example to be a 90/10 beamsplitter sending 90% of the light to the reference arm and 10% of the light to the sample arm. In this case, the reference arm light can provide signal amplification via the asymmetric interferometer, whereas the light in the sample arm can be reduced to prevent sample photodamage.

After passing through optional waveplate/attenuator 606, the probe beam is incident on dichroic 608, which reflects the probe beam 602 towards focusing optic 230. As mentioned above, dichroic 608 is illustrated to reflect probe light and transmit IR light, but the opposite configuration can be used as well. In either case, IR beam 610 and probe beam 612 may be substantially parallel after dichroic 608 such that both can be focused by focusing optic 230 onto sample 210 such that the two IR and probe beam focused spots are substantially overlapping. IR and probe beams 610 and 612 are illustrated as collimating coming into focusing optic 230, but in some configurations, one or more of the beams can be focused to the back focal plane of the objective, for example in systems that involving scanning the IR and/or probe beam with a galvo or fast scanning mirror system, and/or for widefield OPTIR operation.

As before, the IR beam is focused to a spot 208 on the sample 210 to induce localized heating in IR absorbing regions of the sample. The probe beam is focused to a spot 231 at least partially overlapped with the IR spot 231 to measure the photothermal response of the sample due to absorption of IR radiation. In this configuration, at least a portion of the probe beam 614 is transmitted through the sample where it is collected by collection optic 616. In some configurations, collection optic 616 is a microscope objective with a substantially similar magnification, numerical aperture, and/or exit pupil diameter as focusing optic 230. In the case of matched objectives, the input and output beam diameters will be substantially the same which can improve the quality of interference between sample and reference beams. Alternately, additional beam conditioning optics (not shown) can be used after the collection optic 616 to adjust the diameter of beam 618 after collection optic 616. Since collection objective 616 does not need to transmit IR light, it can be a refractive objective if desired. Transmitted beam 618 will include light that directly passes through the sample indicated by $I_{sam}$ as well as light that has been multiply reflected from the sample and substrate, indicated as $I_{sub}$. This pair of beams corresponds to beam pair 130 illustrated in FIG. 1B.

Turning to the reference arm, the reference beam on path 604 passes through optional waveplate 620 and to optional steering mirror 622 before entering polarizing beams splitter 624 which combines it with the transmitted reference beam 618 and then separates the combined beams by polarization, sending beams of orthogonal polarization to detectors 248 and 250. Alternately, these steps can be separated, e.g. a beam combiner to combine sample and reference beams and a polarizing beam splitter to separate the combined beam based on polarization. In one embodiment, waveplate 620 is a quarter waveplate to change linearly polarized probe light into elliptically polarized light. When combined with linearly polarized light on the sample arm with the correct polarization, detectors 248 and 250 will operate in quadrature, i.e. with a 90° optical phase difference between them. The signals 252 and 254 from the quadrature detectors 248 and 250 are measured/demodulated by DEMOD/DAQ 256 alternately in combination with processor/CPU 260. The detector signals can be demodulated for example using any of the schemes described associated with FIGS. 2-5. Note that the transmission detection embodiment of FIG. 6 could also be implemented in a counter-propagating geometry as illustrated in FIG. 2. In this case the collecting optic 616 in FIG. 6 would also serve the role of IR focusing optic 206 in FIG. 2, i.e. using either a reflective objective for both tasks, or a refractive objective that is transmissive to both IR and probe wavelengths.

Figure 7:
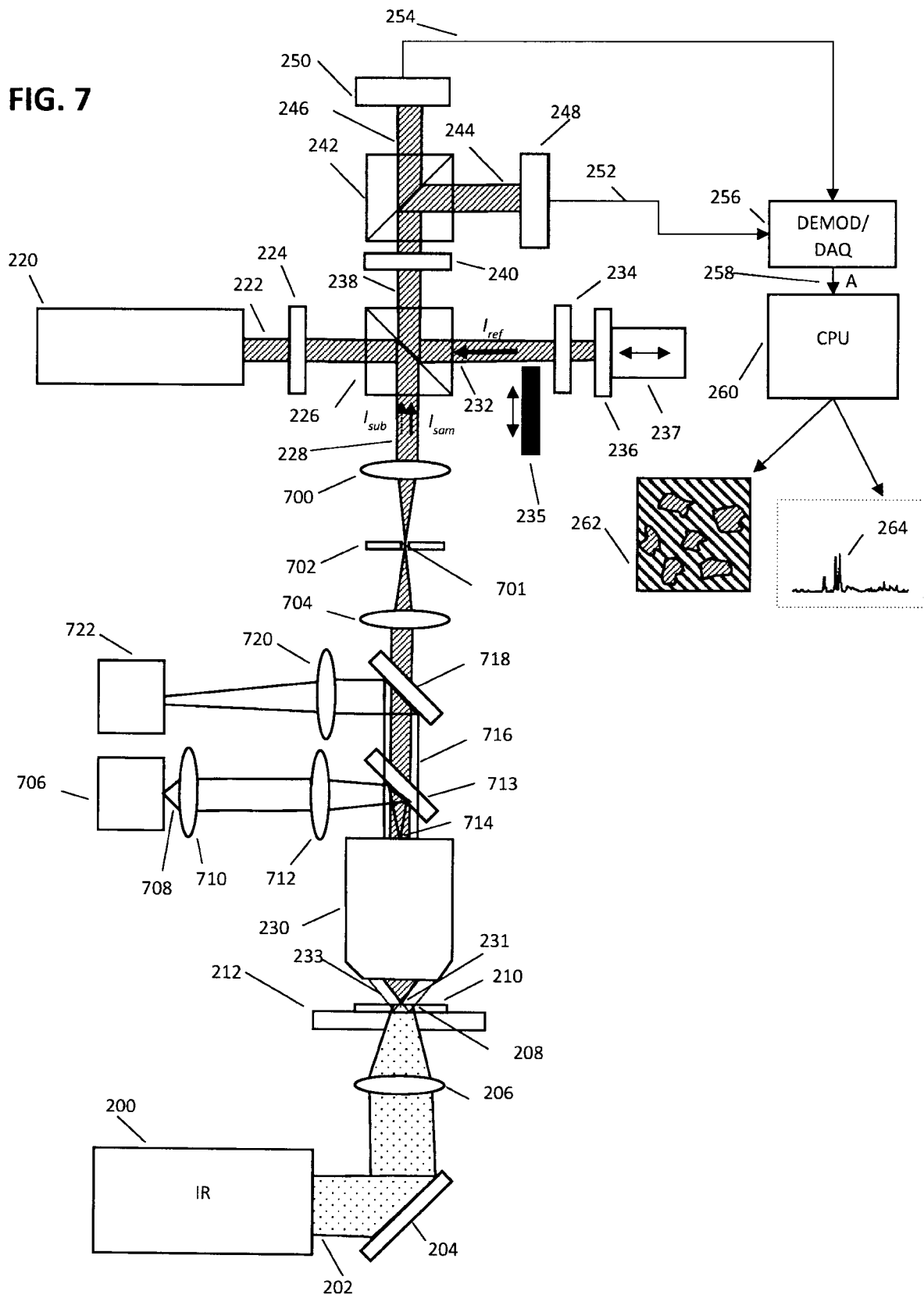
FIGS. 7 and 8 depict an alternate embodiments of asymmetric quadrature interferometers for thin film interference suppression.

FIG. 7 illustrates an alternate embodiment including some additional features. FIG. 7 is based on FIG. 2 and where the same numerical callouts are used, description associated with FIG. 2 apply as appropriate. FIG. 7 includes two additional features, a including a spatial filter pinhole and a sample imaging system. The spatial filter pinhole is an optional component to allow filtering of a return beam from the sample to provide better interference efficiency with the reference beam. The sample viewing optics provide a view of the sample for navigation to a region of interest, coarse focus adjustment, and, if desired, visualization of the focused probe beam. FIG. 7 provides many of the advantages of the system of previously-described embodiments, with the additional advantage of producing simultaneous or sequential optical microscopy imaging, including support for fluorescence imaging. The embodiment of FIG. 7 employs the same counter-propagating geometry FIG. 2 with the same IR beam path as FIG. 2. The probe beam path, however, contains additional elements. In this case, the probe beam on sample path 228 passes through focusing optic 700 and then is focused to a spot 701 at the center of pinhole 702 and then recollimated by focusing optic 704. FIG. 7 illustrates a relay system of lenses 700 and 704 with unity magnification, but the lens focal lengths can be alternately chosen to magnify or demagnify the beam as desired, e.g. to optimally fill the input pupil of focusing optic 210. Ignoring optics 713 and 718 for now, the recollimated probe beam is focused by focusing optic 230 as with FIG. 2 and then probe light is collected after reflecting, scattering, and/or transmitting through sample 210. In the configuration shown, light is collected in the reflection/backscattered direction using focusing optic 230 where it is recollimated and traverse back to focusing optic 704. The reflected/backscattered probe beam, however may contain substantial distortions associated with its interaction from the sample, especially if the sample is rough on the micro/nanoscale. Spatial filter pinhole 702 can be used to block out of focus return light and/or improve the mode shape of the return beam such that it will have a more uniform phase front and interfere more efficiently with the reference beam on path 232. Note that the spatial filter pinhole 702 filters the beam only in the spatial domain, not the temporal domain. So even as the spatial filter pinhole may be eliminating some information about the sample surface encoded in its wavefront, the pinhole does not erase changes in intensity of collected light due to IR absorption from the sample. In actuality, the pinhole can enhance the detection sensitivity by acting as a vignetting aperture when thermal expansion by the sample causes a change in the collimation of the return probe beam. In this case, changes in return beam collimations, for example due to changes in sample locations/and or surface curvature due to thermal expansion, will result in subtle changes in the size of the focused spot 701. Changes in the focused spot size at the pinhole 702 will lead to a change in the optical throughput through pinhole 702 and can provide enhanced sensitivity. Further, having passed through the spatial filter pinhole 702 the sample returned probe beam has a more even phase front with better spatial coherence than the raw beam scattered off the sample. The spatially filtered sample return beam on path 228 can then combine with reference light on path 322 to generate interference at quadrature detectors 248 and 250, as described associated with FIG. 2. Processing of the signals from quadrature detectors 248 and 250 to produce a composite signal that is insensitive to the sample/substrate interference can be performed with the signal processing steps described associated with any of the previous embodiments.

FIG. 7 also illustrates an optical viewing system incorporated in the asymmetric interferometer. Microscope illumination light source 706 emits a beam of light 708 that is optionally collimated by collector/collimating lens 710 and then optionally focused with focusing optic 712 and reflected towards focusing optic 230 via reflector 713. In one embodiment illumination light is focused by one or more lenses 710/712 at a point 714 at or near the back focal plane of focusing optic 230, as per a Kohler illumination arrangement. The illumination optical path can also include optional diaphragms (not shown) for example aperture stop and field stop, used to control illumination brightness, contrast, and illumination area. Illumination light is then directed to sample 210 to illumination a region of interest of the sample. In the configuration shown, light reflected and/or scattered by the sample and recollected by focusing optic 230, e.g. a microscope objective. In alternative configurations, scattered/transmitted illumination light can be collected with a separate collection objective on the opposite side of the sample. In the epi-illumination configuration shown, at least a portion of collected light passes through reflector 713 where it is optionally reflected via reflector 718 towards a tube lens 712 to form an image at the surface of camera 722 and/or optionally viewed through an eyepiece. Images of the sample can then be used to select a region of interest for OPTIR measurements with the asymmetric interferometer as described above. Reflector 713 can be a partially reflecting mirror or alternately a dichroic mirror, especially in the case of fluorescent excitation for fluorescence microscopy. In the case of fluorescent excitation, reflector 713 can be a dichroic mirror to reflect the excitation beam and transmit the wavelength shifted fluorescent emission such that it can be collected by camera 722. Reflector 713 can also be movable/removable to enable removal from the optical path during OPTIR measurements and replacement for optical imaging. Reflector 713 may also be a multi-line dichroic mirror, for example with two or more reflection/transmission bands, and in some configurations can contain a passband for one or more wavelengths corresponding to probe radiation source 220. Reflector 718 can similarly be a partially reflecting mirror to reflect desired collected wavelengths to camera 722 and other wavelengths back towards interferometer detectors 248/250. Reflector 718 can also be movable/removable, e.g. on a translation stage, to remove the reflector from the interferometer beam path during OPTIR measurements. Reflectors 713 and 718 can also be chosen to be generally highly transmissive at the probe beam wavelength, yet reflecting a small portion of the probe light to the camera 722 for visualization of the position/size of the probe beam on the sample.

Figure 8:
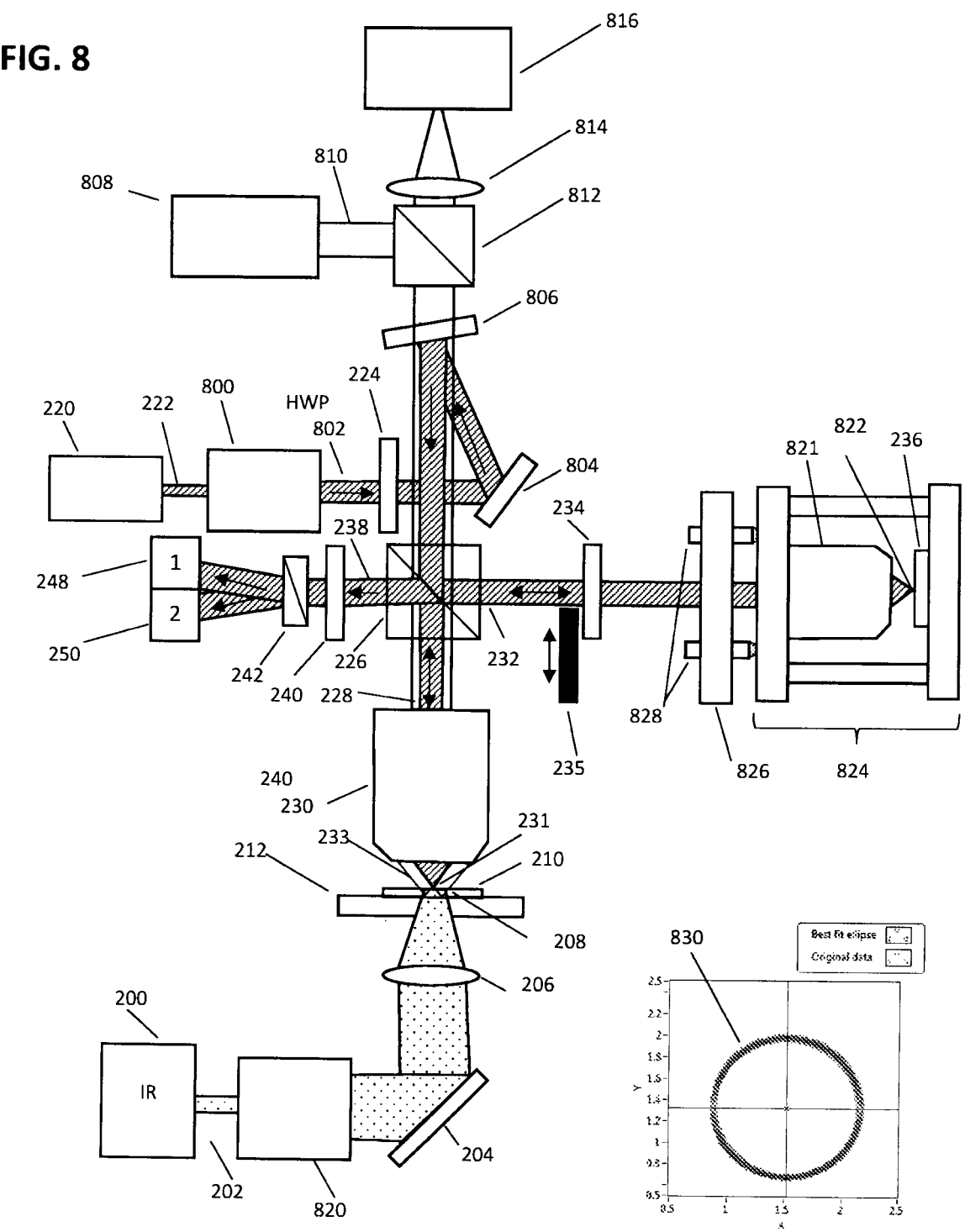

FIG. 8 illustrates another embodiment which provides OPTIR measurements via asymmetric quadrature interferometry and viewing of the sample and probe laser spot on the sample. FIG. 8 is based on FIG. 2 and where the same numeric callouts are used, the discussion associated with FIG. 2 applies as appropriate. FIG. 8 also illustrates some additional optional features. IR illumination is provided as shown in FIG. 2 with the addition of optional beam expander 820 which is preferably a reflective beam expander for example based on spherical (and/or aspheric) mirrors. Probe beam source 220 emits a beam of probe radiation 222 which may also optionally be expanded with beam expander 820 to produce expanded beam 802. Expanded beam 802 passes through waveplate/polarizer 224 to adjust to a desired polarization and then traverses though an arrangement comprising reflectors 804 and 806 that operates according to the same principles as previously described with respect to FIG. 4.

Reflector 806 preferably comprises a dichroic mirror that is highly reflective to at least one wavelength of probe source 220, while highly transmissive at other wavelengths. Thus probe radiation from probe source 220 reflects off reflector 806 in the direction of the sample 210 as indicated by the downward arrow. Probe radiation passes through beam splitter 226 where it is divided onto sample and reference paths 228 and 232 as previously described with respect to FIG. 2.

Light returning from the sample on path 228 is recombined with reference light from path 232 via beam splitter 226 or an alternate beam combiner (not shown) and interfering light on path 238 optionally passes through waveplate 240 and then to polarizing beam splitter 242 (e.g. a Wollaston prism) where it is divided onto to two paths based on polarization to quadrature detectors 248 and 250 as described previously. The outputs of detectors 248 and 250 are acquired and demodulate in the frequency and/or time domain as discussed associated with FIGS. 2-4.

The embodiment of FIG. 8 also includes an alternate arrangement for viewing of the sample and probe beam spot on the sample. Illumination source 808 provides a sample illumination beam 810, for example using the Kohler illumination scheme described associated with FIG. 7. The illumination beam is directed towards the sample using partial reflector 812 which can be a simple plate beam splitter, a beam splitter cube, and/or a filter cube assembly, for example comprising one or more excitation filters, dichroic mirrors, and emission filters for example to excite fluorescent emission from the sample and permit transmission of the fluorescence emission to camera 816. Reflector 812 may also be exchangeable, for example to support multiple fluorescent excitation/emission wavelengths. Light returning from sample 210 through focusing optic 230 is focused by tube lens 814 or other focusing optic to create an image on the surface of camera 816. Reflector 806 can be chosen to be partially reflective at the probe excitation wavelength to allow transmission of a portion of probe light to the camera to visualize the location of the focused probe beam on the sample. Optional shutter/beam block 235 can be used to block the much brighter reference arm to prevent the camera 816 from being saturated when viewing the sample and/or focused probe beam at the sample. An optional shutter (not shown) can also block the light from going to the camera when the reference arm is unblocked to prevent damage to the camera.

The embodiment in FIG. 8 also contains additional optional features regarding the reference path. FIG. 8 illustrates the use of a Linnik style interferometer where an additional focusing optic 821 (e.g. a microscope objective) focuses the reference beam to a spot 822 on reference reflector 236. Linnik-style interferometers are interferometers with a complementary focusing element in the reference path. In some cases the complementary focusing element in the reference path is chosen to match that of the focusing element in the measurement path, for example two matched microscope objectives. In embodiments within the scope of this disclosure a single focusing optic can be used with multiple different sample objectives that include focusing elements that do not match the focusing optic of the reference path. As used throughout this disclosure, the term "Linnik-style interferometer" refers to both kinds of systems: those where the complementary focusing element in the reference path and the sample measurement focusing element match, and those where they do not. Having the two focusing elements match can provide the best phase front matching at the detectors, but allowing them to not match provides support for use of more sample focusing elements (e.g. different microscope objectives) with a single complementary focusing element in the reference path.

The arrangement of FIG. 8 makes the interferometer largely insensitive to relative tilt between the sample 210 and reference reflector 236 which can substantially improve the robustness of the interferometric detection. Focusing optic 821 and reference reflector 236 can optionally be arranged on a common carrier 824 that in turn can be adjusted using kinematic tip/tilt/translation stage 826 with adjusters 828. Adjusters 828 can be manually operated, motor controlled, and/or incorporate piezo actuators. Kinematic stage 826 can be used for at least two different purposes: (1) when actuators 828 are adjusted individually, they can provide tip/tilt adjustment to optimize the interferometer alignment; (2) when actuated together (and generally with a third actuator not shown), it can provide translation of the whole reference mirror assembly (e.g. carriage 824 and its contents) to provide relative phase shifts between the sample and refrence arms of the interferometer. This can be helpful in aligning and optimizing the interferometer. For example, if the outputs of the two detectors 248 and 250 are plotted in an XY plot while actuators 824 periodically change the reference mirror assembly position, a Lissajous pattern 830 will result indicating the relative quality of the quadrature between the two detectors. At perfect quadrature, the Lissajous pattern will be round, whereas alignment errors in the interferometer components or other polarization distortions can introduce eccentricity into the Lissajous pattern. In one embodiment the Lissajous pattern can be continuously or periodically measured while OPTIR sample imaging is being performed and the characteristics of the Lissajous pattern can be used to correct OPTIR measurements resulting from any errors from ideal quadrature. Quadrature detection error compensation techniques are described for example by Hwang and Park in quadrature errors in "Quadrature-detection-error Compensation in a Sinusoidally Modulated Optical Interferometer Using Digital Signal Processing," Current Optics and Photonics Vol. 3, No. 3, June 2019, pp. 204-209 hereby incorporated by reference. One process for correcting OPTIR measurement results due to variations in Lissajous eccentricity involves measuring outputs of detectors 248 and 252 for a plurality of optical phase differences between the reference and sample arm and fitting an ellipse to the resulting Lissajous figure, and then scaling the OPTIR quadrature sum components by metrics associated with the fit ellipse. For example, the ellipse major and minor diameter and rotation angle can be used to scale the lock-in amplifier components before calculating the RMS sum. The quadrature Lissajous FIG. 830 can be measured on time scales as quickly as at each OPTIR image pixel if desired to provide dynamic correction factors if desired. Alternately, the Lissajous figure can be measured on a periodic basis (e.g. after a given number of scan pixels, lines, images) and/or on an as needed basis to check interferometer and waveplate alignment.

FIG. 8 includes a Wollaston prism as the polarizing beamsplitter, which has the advantage of being compatible with many multi-segment detectors that are inexpensive and widely available. Additionally, the use of reflector 806 in the arrangement shown in FIG. 8 results in light beams 810 and 802 both being incident upon the sample 210 to facilitate simultaneous brightfield and IR imaging, and simultaneous viewing of the probe beam measurement spot on the sample.

The embodiments described herein are examples only. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical elements, control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

The invention claimed is:

1. A method of operating a photothermal infrared microscope, the method comprising:
   a) illuminating a region of a sample with a pump beam of infrared radiation;
   b) dividing a beam of probe radiation onto at least two paths, the at least two paths including a first path towards a sample and a second path towards a reference reflector;
   c) directing probe radiation on the first path to illuminate the sample at least partially overlapping the infrared illuminated region of the sample, wherein the probe radiation interacts with at least two surfaces of the sample to create interfering radiation;
   d) collecting the interfering radiation from the sample as collected probe light;
   e) recombining the collected probe light with probe radiation reflected from the second path to form recombined light;
   f) dividing the recombined light between at least two detectors;
   g) using signals from the at least two detectors to generate a signal indicative of infrared absorption by the sample that at least partially suppresses effects of thin film interference from the interfering radiation.

2. The method of claim 1 wherein the two detectors are substantially in quadrature.

3. The method of claim 1 in which the signals from the at least two detectors are combined in at least one of a sum of squares and a root-mean-square sum.

4. The method of claim 3 in which the combined signals are demodulated by a lock-in amplifier.

5. The method of claim 3 in which the combined signals are analyzed by time domain demodulation.

6. The method of claim 1 in which the signals from the at least two detectors are demodulated with a lock-in amplifier and then combined in a root-mean-square sum.

7. The method of claim 1, wherein (c) includes creating interfering radiation in at least one of forward and backward directions.

8. The method of claim 1, wherein the recombined light is divided between the at least two detectors at (f) based upon polarization.

9. The method of claim 1, further comprising inserting a reflector at the probe beam path and
   illuminating the sample with a light source to obtain an optical image of the sample.

10. The method of claim 1, further comprising generating a quadrature Lissajous figure and corresponding dynamic correction factors based upon the composite photothermal signal.

11. The method of claim 1, wherein the composite photothermal signal that at least partially suppresses effects of thin film interference from the interfering radiation has a signal-to-noise ratio of at least 1000:1.

12. The method of claim 1, further comprising focusing probe radiation with a complementary focusing element on the second path to the reference reflector.

13. The method of claim 1 wherein probe radiation reflected from the reference reflector has an intensity of at least ten times that of an intensity of probe radiation reflected from a secondary reflection from the sample.

14. The apparatus of claim 13, further comprising a brightfield subsystem including a brightfield light source and a reflector, wherein the brightfield subsystem is configured to be inserted along the probe beam path to illuminate the sample and obtain a brightfield image thereof.

15. The apparatus of claim 13, further comprising a complementary focusing optic along the second path.

16. The apparatus of claim 13 wherein the two detectors are substantially in quadrature.

17. The method of claim 1, further comprising:
(h) generating a signal indicative of infrared absorption by the sample.

18. An apparatus for photothermal infrared microscopy, the apparatus comprising:
an infrared light source configured to illuminate region of a sample with infrared radiation;
a probe beam source configured to generate a beam of probe radiation having a wavelength lower than the wavelength of the infrared radiation;
a beam splitter arranged to divide the probe beam of radiation onto at least two paths, the at least two paths including a first path towards the sample and a second path towards a reference reflector, wherein the probe beam on the first path will illuminate the sample at a region at least partially overlapping the infrared illuminated region of the sample and interact with at least two surfaces of the sample to create interfering radiation;
a collection optic arranged to collect probe light from the sample, including the interfering radiation;
a beam combiner configured to recombine light reflected off the reference reflector with probe light collected from the sample;
at least two detectors;
a beam splitter configured to divide the recombined light between the at least two detectors; and
a signal processor that combines signals from the at least two detectors to generate a signal indicative of infrared absorption by the sample while at least partially suppressing effects of thin film interference from the interfering radiation.

19. The apparatus of claim 18 wherein the processor is configured to combine the signals from the at least two detectors in a root-mean-square sum.

20. The apparatus of claim 19 further comprising a lock-in amplifier configured to demodulate the signal from each of the at least two detectors.

21. The apparatus of claim 20 wherein the lock-in amplifier is configured to perform time domain demodulation based on an operating frequency of the pump beam of infrared radiation.

22. The apparatus of claim 21, wherein the beam splitter configured to divide a recombined beam between the at least two detectors is a polarizing beam splitter.

* * * * *